United States Patent
Ogawa

(10) Patent No.: US 9,843,491 B2
(45) Date of Patent: Dec. 12, 2017

(54) NETWORK ELEMENT IN NETWORK MANAGEMENT SYSTEM, NETWORK MANAGEMENT SYSTEM, AND NETWORK MANAGEMENT METHOD

(71) Applicant: FUJITSU LIMITED, Kawasaki-shi, Kanagawa (JP)

(72) Inventor: Koji Ogawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 544 days.

(21) Appl. No.: 14/487,635

(22) Filed: Sep. 16, 2014

(65) Prior Publication Data
US 2015/0142961 A1    May 21, 2015

(30) Foreign Application Priority Data
Nov. 21, 2013  (JP) .................. 2013-241246

(51) Int. Cl.
*H04L 12/24* (2006.01)
*H04L 12/26* (2006.01)

(52) U.S. Cl.
CPC ...... *H04L 43/0817* (2013.01); *H04L 41/0695* (2013.01); *H04L 41/0816* (2013.01); *H04L 43/10* (2013.01)

(58) Field of Classification Search
CPC ............ H04L 43/0817; H04L 41/0695; H04L 41/0816; H04L 12/56; H04L 47/10; H04L 47/12; H04L 41/0654; H04L 41/0668; H04L 41/00; H04W 28/0289; H04W 28/08; H04W 48/06; H04W 36/08; H04W 36/22; H04W 48/18; H04W 24/06; H04W 72/1278; H02J 3/14; H02J 2003/003

USPC .......................................................... 709/224
See application file for complete search history.

(56) References Cited

U.S. PATENT DOCUMENTS

| | | | |
|---|---|---|---|
| 5,461,608 A | 10/1995 | Yoshiyama | |
| 2003/0210701 A1* | 11/2003 | Saiki ..................... | H04L 41/042 370/401 |
| 2008/0114895 A1* | 5/2008 | Chun .................. | H04L 67/1008 709/238 |
| 2010/0302939 A1* | 12/2010 | Denis .................. | H04L 43/0882 370/230 |
| 2011/0188382 A1* | 8/2011 | Zee ....................... | H04W 24/06 370/242 |
| 2013/0117447 A1* | 5/2013 | Yoshida .............. | G06F 11/3006 709/224 |
| 2014/0089492 A1* | 3/2014 | Nelson .................. | H04L 67/325 709/224 |
| 2014/0304544 A1* | 10/2014 | Takenaka ............ | H04L 67/1097 714/4.2 |

(Continued)

FOREIGN PATENT DOCUMENTS

| | | |
|---|---|---|
| JP | 07-58765 | 3/1995 |
| WO | 2002-045352 | 6/2002 |

*Primary Examiner* — Patrice Winder
*Assistant Examiner* — Aye M Aung
(74) *Attorney, Agent, or Firm* — Fujitsu Patent Center

(57) ABSTRACT

A network element serves as a first network element, monitors communication with a monitor apparatus to monitor the state of the monitor apparatus, and controls the setting of monitor connection with one or more second network elements which are communicably connected to the first network element and the setting of monitor connection between the second network elements and the monitor apparatus, according to the monitor result.

17 Claims, 25 Drawing Sheets

(56) References Cited

U.S. PATENT DOCUMENTS

2015/0100661 A1* 4/2015 Heise ................. H04L 47/125
                                                                709/213

\* cited by examiner

FIG. 7

300: EMS MANAGEMENT TABLE (CONNECTION RELATION LIST)

| No. | TARGET NE | GNE CANDIDATE | CONNECTION RELATION (X2) |
|---|---|---|---|
| 1 | #A | NOT CANDIDATE | #B |
|   |    |               | #C |
|   |    |               | #D |
|   |    |               | #E |
| 2 | #B | NOT CANDIDATE | #A |
|   |    |               | #C |
|   |    |               | #D |
| 3 | #C | NOTIFIED | #A |
|   |    |          | #B |
|   |    |          | #D |
| 4 | #D | NOT CANDIDATE | #A |
|   |    |               | #B |
|   |    |               | #C |

| No. | TARGET NE | GNE CANDIDATE | CONNECTION RELATION (X2) |
|---|---|---|---|
| 5 | #E | NOTIFIED | #A |
|   |    |          | #F |
|   |    |          | #G |
|   |    |          | #H |
| 6 | #F | NOT CANDIDATE | #E |
|   |    |               | #G |
|   |    |               | #H |
| 7 | #G | NOT CANDIDATE | #E |
|   |    |               | #F |
|   |    |               | #H |
| 8 | #H | NOT CANDIDATE | #E |
|   |    |               | #F |
|   |    |               | #G |

FIG. 10

(A) NE#A MANAGEMENT TABLE (CONNECTION RELATION LIST)

| BEFORE EMS LOAD INCREASES | | |
|---|---|---|
| ADJACENT NE | STATE OF GNE | DEPENDENT RELATION |
| B | Off | Off |
| C | Off | Off |
| D | Off | Off |
| E | Off | Off |

500

(B) NE#A MANAGEMENT TABLE (CONNECTION RELATION LIST)

| IMMEDIATELY AFTER EMS LOAD INCREASES | | |
|---|---|---|
| ADJACENT NE | STATE OF GNE | DEPENDENT RELATION |
| B | Off | Off |
| C | On | On |
| D | Off | Off |
| E | On | Off |

500

(C) NE#A MANAGEMENT TABLE (CONNECTION RELATION LIST)

| WHEN GNE LOAD INCREASES (IS CHANGED) | | |
|---|---|---|
| ADJACENT NE | STATE OF GNE | DEPENDENT RELATION |
| B | On | On |
| C | Off | Off |
| D | Off | Off |
| E | On | Off |

500

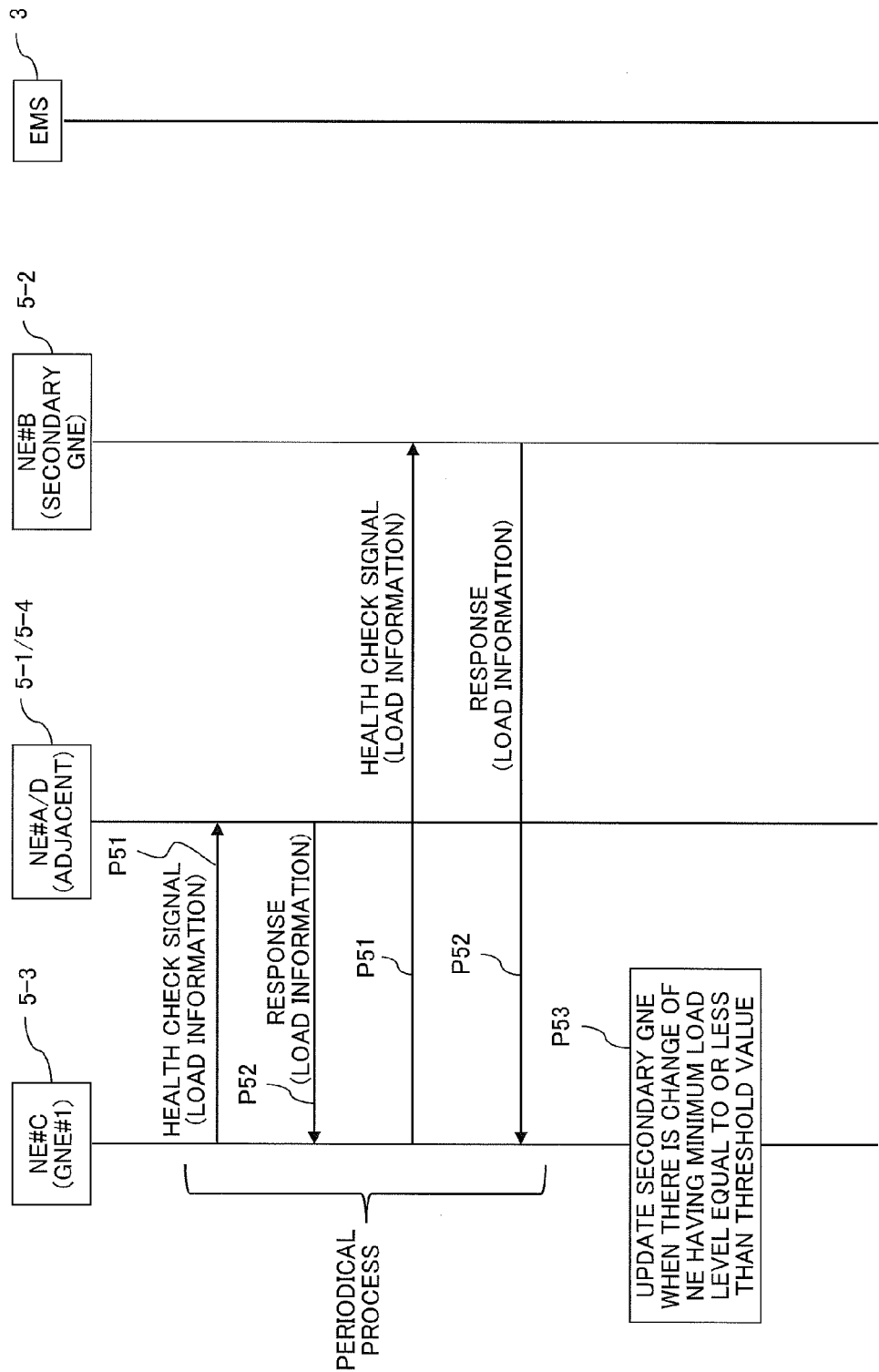

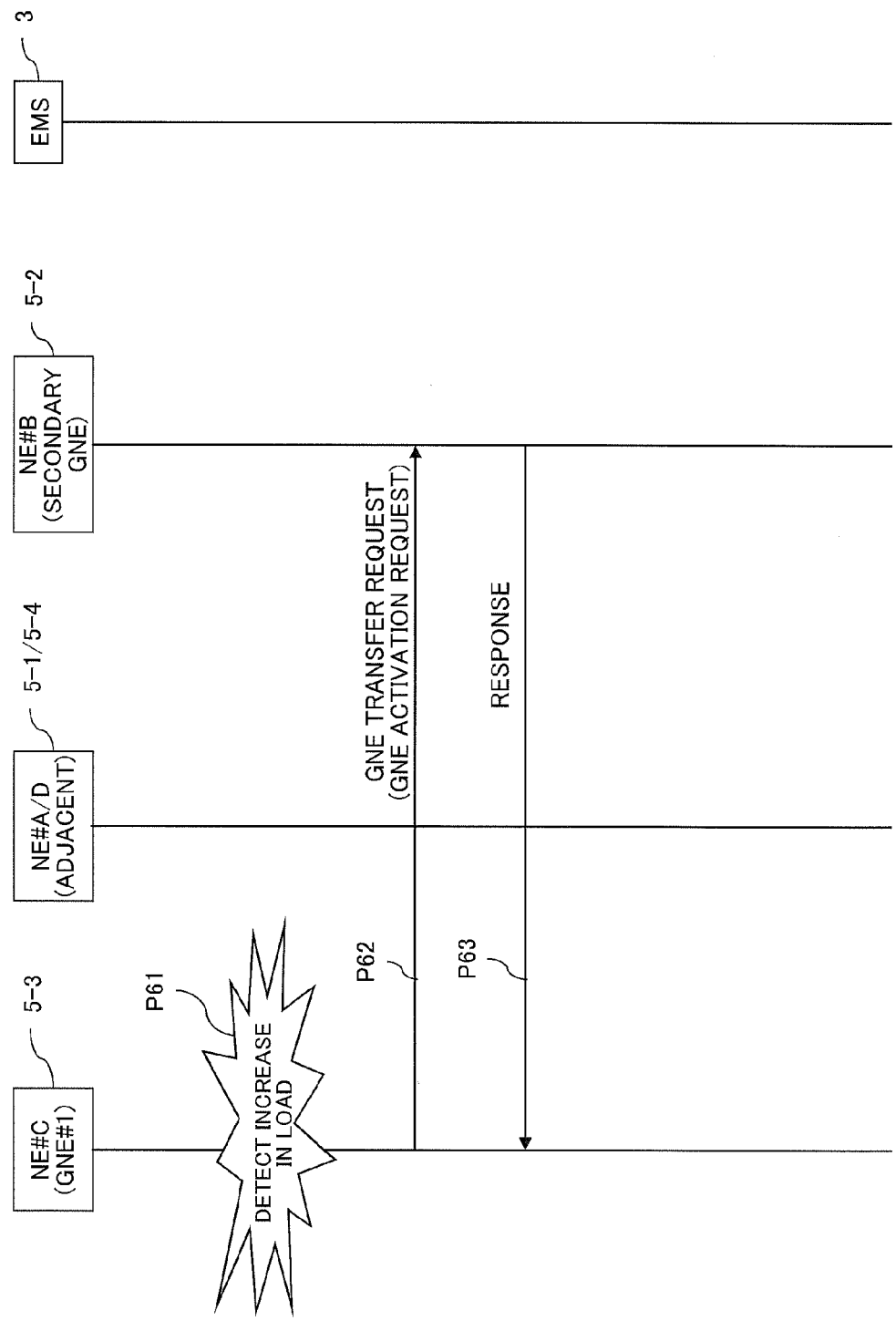

NETWORK ELEMENT IN NETWORK MANAGEMENT SYSTEM, NETWORK MANAGEMENT SYSTEM, AND NETWORK MANAGEMENT METHOD

CROSS-REFERENCE TO RELATED APPLICATION

This application is based upon and claims the benefit of priority of the prior Japanese Patent Application No. 2013-241246, filed on Nov. 21, 2013, the entire contents of which are incorporated herein by reference.

FIELD

The embodiments discussed herein are related to a network element in a network management system, a network management system, and a network management method.

BACKGROUND

FIG. 25 is a diagram illustrating the structure of a network monitoring control system disclosed in WO 2002/045352 A. In FIG. 25, reference numeral 10 denotes a monitor apparatus, reference numeral 11 denotes a gateway server, and reference numerals 12 to 15 denote transmission apparatuses which are connected to form a ring network by an optical cable 23. Each of the transmission apparatuses 12 to 15 communicates monitor control information with each other in the ring network.

The monitor control information is transmitted as SDH header information elements D1, D2, and D3 of an SDH optical signal which is transmitted through the optical cable 23. In FIG. 25, the DCC channel 24 represented by a dotted line transmits the monitoring control information between the transmission apparatuses. The "DCC" is an abbreviation of a data communication channel.

The monitor apparatus 10 is physically connected to a specific transmission apparatus (GNE) among the transmission apparatuses 12 to 15 through the gateway server (GWS) 11 in order to perform a monitor and control on the ring network. The monitor apparatus performs communication for the monitor control information based on a predetermined communication protocol. The "GNE" is an abbreviation of a gateway network equipment or a gateway network element.

In FIG. 25, physical links 21 and 22 are formed by using separate cables between the gateway server 11 and a plurality of GNEs (for example, two GNEs 12 and 13).

The first GNE 12 and the second GNE 13 are designed and set by a maintainer. Thereafter, the gateway server 11 controls the link 21 and the link 22 according to, for example, the load state of the GNEs 12 and 13 to achieve an autonomous distributed process.

In the system disclosed in WO 2002/045352 A, it is possible to control the switching or operation of the two GNEs which are set in the ring network in advance. However, when a failure (for example, a double failure) occurs in each of the transmission apparatuses set as the GNEs, a GNE function is no longer available in the ring network.

When a load is concentrated on all of the transmission apparatuses set as the GNEs, it is predicted that the GNE function will be impaired even though the load is distributed, similarly to the case of the double failure.

Further, since the maintainer intervenes in the design and setting operation to build the GNE, a human error may be occurred.

SUMMARY

According to one aspect, a network element includes: a monitor configured to monitor communication with a monitor apparatus to monitor a state of the monitor apparatus; and a controller configured to control a first setting and a second setting according to the monitor result of the monitor. The first setting includes a setting of a monitor connection between the network element which is a first network element and one or more second network elements communicably connected with the first network element. The second setting includes a setting of a monitor connection between the second network element and the monitor apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of an EMS management table (connection relation list) stored in (or managed by) the EMS;

FIG. 10 is a diagram illustrating a management table (connection relation list) stored in (managed by) the NE;

FIG. 11 is a sequence diagram illustrating an example of a secondary GNE selection process performed by a primary GNE;

FIG. 12 is a sequence diagram illustrating an example of a process when the load of the primary GNE increases;

DESCRIPTION OF EMBODIMENTS

Figure 1:
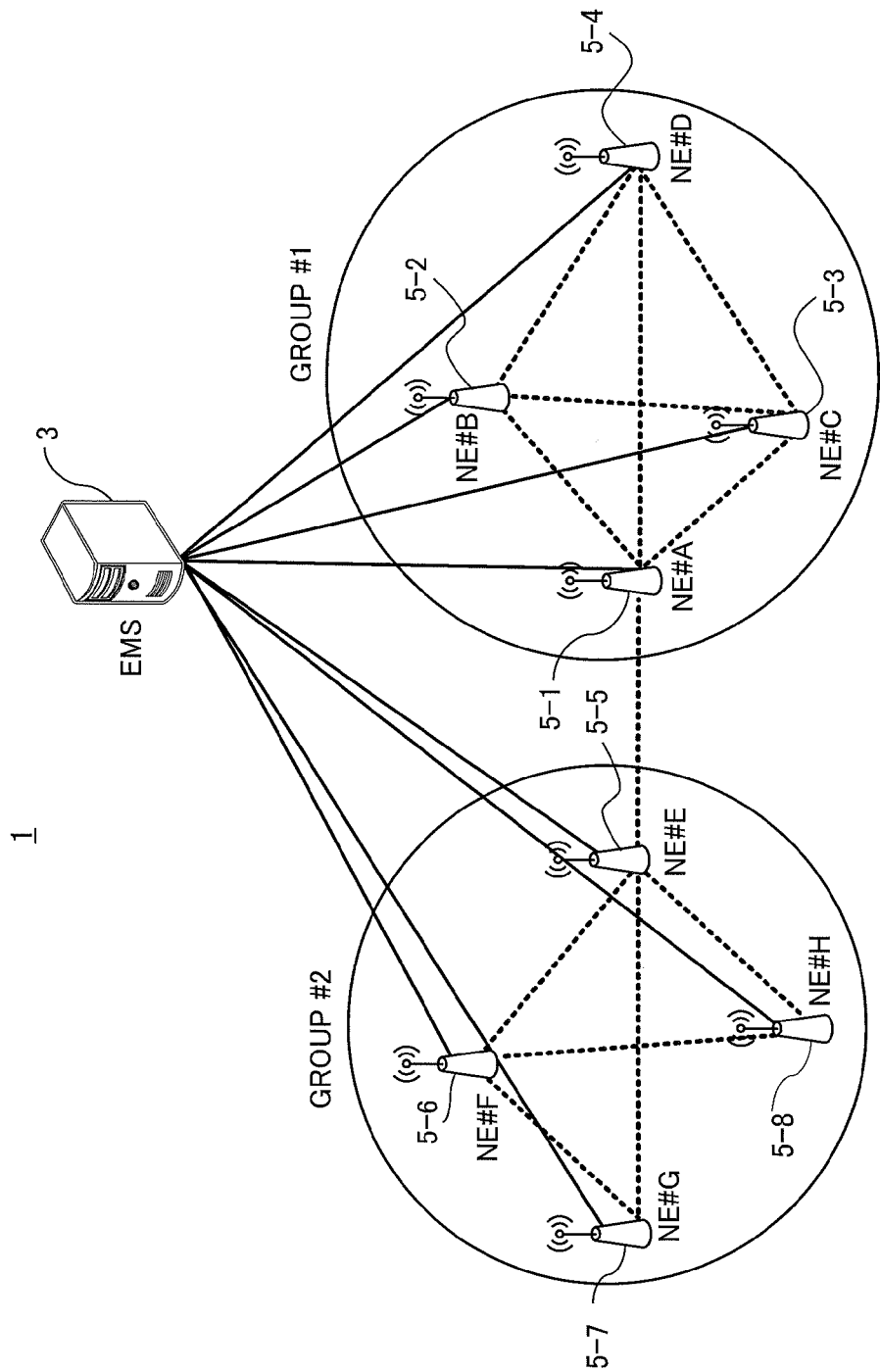
FIG. 1 is a diagram illustrating an example of a network topology when a network monitor system (EMS) normally monitors a network element (NE)

Hereinafter, embodiments will be described with reference to the drawings. However, the following embodiments are merely illustrative and are not intended to exclude various modifications and technical applications which are not described below. In the drawings used in the following embodiments, the same or similar components are denoted by the same reference numerals unless otherwise mentioned.

[Outline]

In recent years, in a mobile communication network, with the coming of the "big data" age or with an acceleration of a reduction in the size of cells (so called "small cells"), the number of base stations or base station control apparatuses, which are elements of the network (hereinafter, abbreviated to "NEs"), has increased trend.

Therefore, there is a concern that the number of NEs to be monitored by a monitor system (or a monitor apparatus) may increase explosively. The monitor system may be called an element management system (EMS) or a network management system (NMS).

The number of NEs to be monitored by the EMS can be determined based on the estimated load level of each NE for the processing capability of the EMS. However, when a large number of NEs reach a load level higher than expected, the EMS may shut down. Hereinafter, a technique available to minimize the load of the EMS and to prevent the EMS from shutting down is proposed.

For example, the EMS selects one or more of the NEs to be monitored as a gateway NE(s) (hereinafter, abbreviated to the "GNE"). For example, the EMS is available to collect load information of the NEs to be monitored and to select the GNE(s) based on the collected load information. As a non-limiting example, the EMS is operable to select an NE having load information indicating the minimum load level that is equal to or less than a predetermined threshold value.

In this embodiment, the GNE includes a function of substitutively performing a part of the functions of the EMS and enabling a monitor of the NE on behalf of the EMS (which may be referred to as a "monitoring proxy function"), in addition to the function of a "gateway" which is available to relay communication related to the monitor between the EMS and the NE. Both of the gateway function and the monitoring proxy function are generically referred to as a "GNE function".

The "monitor" of the NE may be referred to as the "operation, administration, and maintenance (OAM)" of the NE. Communication related to the OAM (hereinafter, may also be referred to as the "OAM communication") may be referred to as the "monitoring communication" or the "maintenance communication". A signal of the OAM communication may be referred to as an "OAM signal", a "monitoring signal", or a "maintenance signal".

The GNE function is provided in the NE to be monitored by the EMS. The NE equipped with the GNE function starts the GNE function and monitors, as the GNE, the other NEs which are communicably connected thereto on the behalf of the EMS. The "start" of the GNE function may be referred to as "activation" or "enabling".

The GNE function starts when a GNE activation request is received from the EMS (or the GNE), or when the NE equipped with the GNE function detects that a failure occurs in the EMS (or the GNE). For example, the GNE activation request is transmitted from the EMS (or the GNE) upon detecting that the load of the EMS (or the GNE) is greater than a predetermined threshold value.

The NE is available to detect that a failure has occurred in the EMS (or the GNE) upon detecting a failure of receiving a predetermined signal from the EMS (or the GNE). An example of the predetermined signal is a signal periodically transmitted from the EMS (or the GNE) to the NE. The signal may be referred to as the "health check signal".

The monitor (or detection) of receiving the activation request and the predetermined signal is performed by the NE selected as the GNE. In other words, the NE selected as the GNE is available to monitor communication with the EMS (or the GNE) to detect the abnormal state (for example, an increase in load or the occurrence of a failure) of the EMS (or the GNE).

Thereby, when the NE selected as the GNE detects that the EMS (or the GNE) is in the abnormal state, the NE (GNE) is operable to activate the GNE function to maintain a minimal OAM for the other NE(s) communicably connected to the GNE. Further, the load of the EMS can be distributed to the NE (GNE).

The GNE function may be stopped when a deactivation request is received from the EMS (or the GNE) or when the failure of the EMS (or the GNE) is recovered. The term "stop" may be referred to as "deactivation" or "disabling". For example, the deactivation request is transmitted from the EMS (or the GNE) upon detecting that the load of the EMS (or the GNE) is equal to or less than a predetermined threshold value.

The NE is available to detect that the failure of the EMS (or the GNE) has been recovered upon receiving a predetermined signal from the EMS (or the GNE). An example of the predetermined signal is a signal periodically transmitted from the EMS (or the GNE) to the NE. The signal may be referred to as the "health check signal".

The selection, activation, and deactivation of the GNE may be controlled by software installed in each of the EMS and the NE. Therefore, it is possible to select, activate, and deactivate the GNE with high flexibility, without the intervention of the maintainer. In addition, when abnormality such as an increase in load or a failure occurs in the GNE, a re-selection or change of the GNE can be autonomously controlled by the software installed in the NE. Therefore, for example, it is possible to provide a scheme for reliably and safely manage a network such as a software-defined network (SDN). The scheme is effective and advantageous in achieving the self-optimization of network management.

Hereinafter, an example will be described in which a network monitor system including the EMS and the NE (GNE) is achieved by utilizing specifications defined by 3GPP (which is a standards group for standardizing a base station and a base station control apparatus of a mobile communication network). The "3GPP" is an abbreviation of the 3rd generation partnership project.

The 3GPP defines, an example of the third-generation mobile communication network, a Universal Mobile Telecommunications System (UMTS) network and a Long Term Evolution (LTE) network which is an improved version of the UMTS.

In the third-generation mobile communication network, the base station may be referred to as an evolved Node B (eNB) and the base station control apparatus may be referred to as a Radio Network Controller (RNC). Therefore, the "NE" to be monitored by the EMS used in the following description may be considered a conceptual term including one or both of the "eNB" and the "RNC".

In the third-generation mobile communication network, an X2 interface is defined as an example of a communication interface between the eNBs and a Radio Network Subsystem Application Part (RNSAP) interface is also defined as an example of a communication interface between the RNCs. The communication interfaces may be generically referred to as an inter-NE interface.

In the following embodiment, the NE selected as the GNE is operable to detect that the EMS is in the abnormal state. Upon a detection of the abnormal state, the GNE make one or more of the other NEs connected thereto by the inter-NE interface dependent to the GNE as a monitor target NE(s) to be monitored by the GNE. In some cases, the monitor target NE dependent to the GNE may be referred to as a "dependent NE". In other words, the GNE and the dependent NE form one "management group". The "management group" may be referred to as an "NE group".

With respect to the inter-NE interface between the GNE and the dependent NE, when a logical connection (or a protocol) for maintenance communication is established, the connection enables the GNE to perform maintenance communication with the dependent NE. For example, when connection (for example, an IP address) used for the maintenance communication has been set, the GNE may activate the connection in the inter-NE interface between the GNE and the corresponding dependent NE.

In other words, a connection used for maintenance communication has only been set to the inter-NE interface, the maintainer does not need to set, for example, an IP address for building up a configuration of the management group. The connection for maintenance communication may be referred to as a maintenance connection or a monitor connection. The unit of management from the start to the end of the maintenance communication using the maintenance connection may be referred to as a maintenance session. The maintenance session is managed by the EMS or the GNE.

In order to prepare for a case where an abnormality occurs in the GNE, any one of the NEs dependent to the GNE (hereinafter, may be referred to as a "primary GNE") may be selected as a secondary GNE. For example, the primary GNE may select, as the secondary GNE, one of the dependent NEs having the minimum load level equal to or less than a predetermined threshold value. The secondary GNE may be referred to as a standby GNE.

The NE selected as the secondary GNE is operable to detect that the primary GNE is in an abnormal state, similarly to the configuration in which the GNE is operable to detect that the EMS is in the abnormal state. In response to the detection of the abnormal state, the secondary GNE activates the GNE function and monitors the primary GNE and the dependent NEs on the behalf of the GNE.

In other words, the monitoring source of the dependent NE is changed from the primary GNE to the secondary GNE. The change in the GNE serving as a monitoring source means a change in the NE in which the GNE function is activated. Apparently, the GNE function seems to be transferred (or succeeds) from the primary GNE to the secondary GNE. Therefore, the change of the GNE may be referred to as a "transfer of the GNE function", for convenience.

The secondary GNE may be determined after an abnormality occurs in the primary GNE. However, a time may be taken for exchanging load information between the NEs or for performing the selection process. When a failure occurs in the GNE, the OAM for the dependent NE is interrupted. Therefore, it is preferable to select (determine) the secondary GNE while the primary GNE is operating normally in order to avoid the interruption of the OAM.

However, since the load state of the dependent NE varies over time, the secondary GNE may be changed according to a change in the load state of the dependent NE. For example, the GNE is operable to perform communication for acquiring the load information between the GNE and the dependent NE to detect the change in the load state. For example, the dependent NE may include its load information into a response signal of the predetermined signal (for example, the health check signal) which is periodically received from the GNE.

When all of the dependent NEs has a load level greater than the threshold value, the GNE may select a plurality of secondary GNEs which have a lower load level than others among the dependent NEs.

When the GNE function is transferred to the secondary GNE, in some cases, some of the NEs dependent to the primary GNE may lose the connection in the inter-NE interface to the secondary GNE. For example, in some cases, an NE which lost one or all of connections in the inter-NE interface(s) to one or all of the plurality of secondary GNEs may occur.

In this case, when a GNE (for example, the primary GNE) other than the secondary GNE is included in other NEs which are connected by the inter-NE interface, the connection-lost NE may be dependent to the GNE.

When no GNE is included in the other NEs which are connected by the inter-NE interface, the connection-lost NE may be dependent to the EMS. When the EMS has already deactivated the maintenance connection with the connection-lost NE, the connection-lost NE may request the EMS to activate the maintenance connection. The request may be transmitted by using, for example, a magic packet. The magic packet is a packet which is used for a remote activation procedure so called a Wake On LAN (WOL) and enables the connection-lost NE to re-start the maintenance connection between the EMS and the NE. Upon receiving the magic packet, the EMS may activate the maintenance connection between the EMS and the connection-lost NE.

As such, when the GNE is changed, some NEs may return to the dependents of the EMS. However, when the number of NEs which is allowed to return to the dependents of the EMS is non-limited, the load of the EMS is not reduced.

Therefore, the upper limit of the number of NEs which is allowed to return to the dependents of the EMS with the change of the GNE may be set. When the number of NEs (for example, NEs which transmit the magic packet) desired to return to the dependents of the EMS is greater than the upper limit, it is preferable to autonomously solve the dependency problem in the NEs rather than to allow the NE(s) to return to the EMS. For example, a plurality of secondary GNEs may be set, regardless of the load state of all of the NEs which have a connection with the connection-lost NE, to thereby distribute the load in the NEs.

First Embodiment: Self-Construction of GNE

In a first embodiment, a GNE self-configuration using the EMS, the eNB, and the X2 interface between the eNBs in the LTE network will be described. A GNE self-construction using the EMS, the RNC, and the RNSAP interface between the RNCs in the UMTS network may be achieved by utilizing the same or similar process described below.

FIG. 1 is a diagram illustrating an example of a network monitor (or, management) system according to a first embodiment. The network monitor system 1 illustrated in FIG. 1 includes, for example, an EMS 3 which is an example of a monitor apparatus and a plurality of NEs (for example, eNBs) 5-1 to 5-N (N is an integer equal to or greater than 2). In FIG. 1, N is 8 and eight NEs 5-1 to 5-8 (NE#A to NE#H) are provided. In the following descriptions, when the NEs 5-1 to 5-N are not necessary to be distinguished from each other, they may be simply referred to as the "NEs 5".

The EMS 3 is communicably connected to each of the NEs 5 and is operable to monitor the state of each of the NEs 5 by using maintenance communication. The maintenance communication is performed by the maintenance connection between the EMS 3 and each of the NEs 5.

The NE 5-1 (NE#A) is communicably connected to the four NEs 5-2 to 5-5 (NE#B, NE#C, NE#D, and NE#E) with the X2 interface, for example.

The NE 5-2 (NE#B) is communicably connected to the three NEs 5-1, 5-3, and 5-4 (NE#A, NE#C, and NE#D) with the X2 interface, for example.

The NE 5-3 (NE#C) is communicably connected to the three NEs 5-1, 5-2, and 5-4 (NE#A, NE#B, and NE#D) with the X2 interface, for example.

The NE 5-4 (NE#D) is communicably connected to the three NEs 5-1 to 5-3 (NE#A to NE#C) by the X2 interface, for example.

The NE 5-5 (NE#E) is communicably connected to the four NEs 5-1 and 5-6 to 5-8 (NE#A and NE#F to NE#H) with the X2 interface, for example.

The NE 5-6 (NE#F) is communicably connected to the three NEs 5-5, 5-7, and 5-8 (NE#E, NE#G, and NE#H) with the X2 interface, for example.

The NE 5-7 (NE#G) is communicably connected to the two NEs 5-5 and 5-6 (NE#E and NE#F) with the X2 interface, for example.

The NE 5-8 (NE#H) is communicably connected to the two NEs 5-5 and 5-6 (NE#E and NE#F) with the X2 interface, for example.

There is no connection between the NE 5-7 and the NE 5-8 (between NE#G and NE#H) with the X2 interface.

As described above, a maintenance connection is established between each of the NEs 5 and the EMS 3. In the example illustrated in FIG. 1, as represented by a solid line, all sessions are established for the maintenance connection between the EMS 3 and each of the NEs 5. Therefore, the EMS 3 is operable to manage the sessions with all of the NEs 5 and to process maintenance signals transceived with all of the NEs 5.

Meanwhile, no session is established for the maintenance connection between the NEs 5, as represented by a dotted line in FIG. 1. Instead, for example, a call control signal for handover is available in the X2 interface.

In this state, the NE 5 which is a GNE candidate in an NE group having a connection relation with the X2 interface is selected by the EMS 3. The selection can be performed based on the load information of each of the NEs 5. As a non-limiting example, the EMS 3 is operable to periodically collect the load information of each of the NEs 5 and to sort the NEs 5 having load information indicating that the load level is equal to or less than a threshold value in ascending order of the collected load levels. A non-limiting example of the load information is a CPU utilization or a memory utilization.

Figure 2:
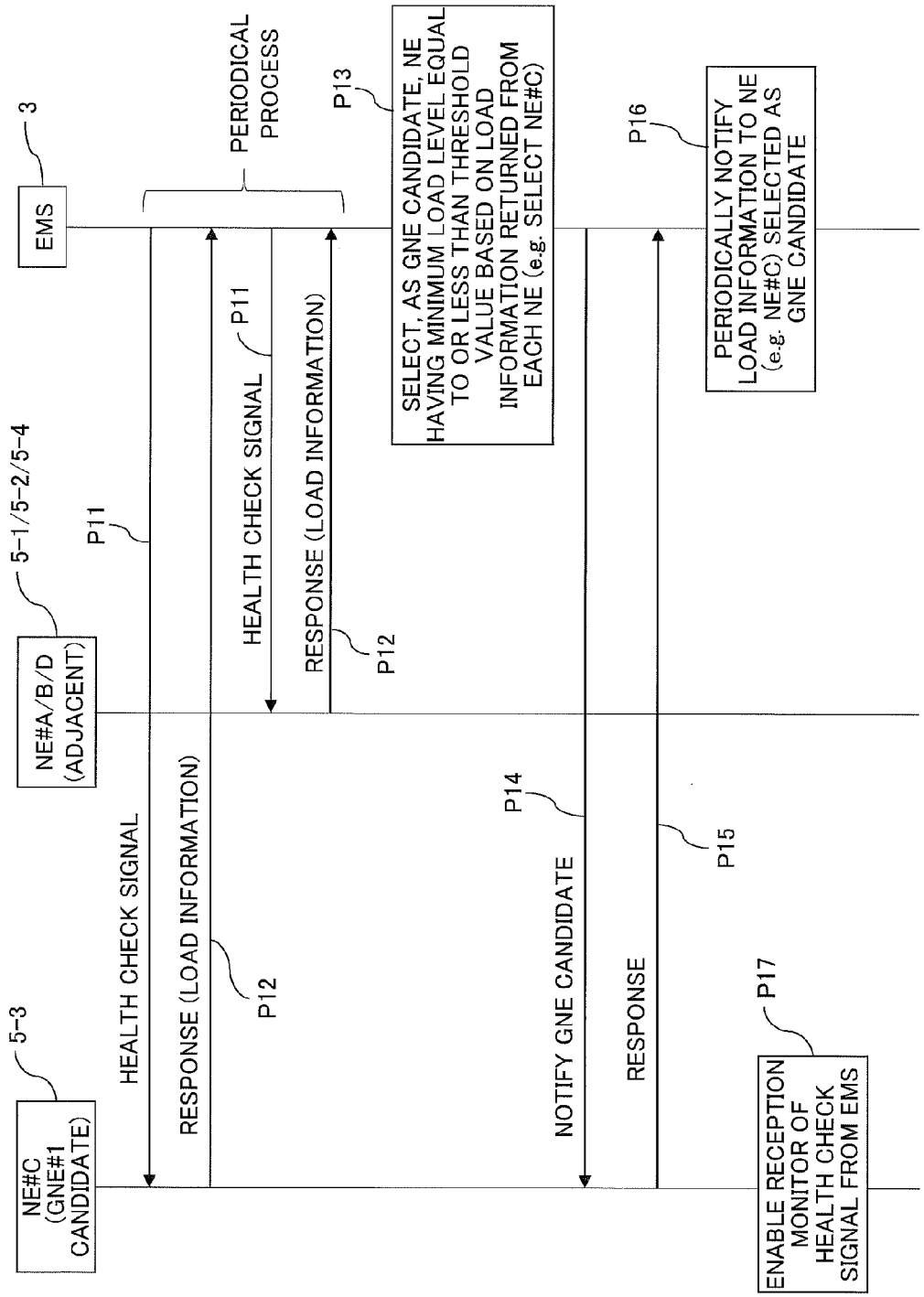
FIG. 2 is a sequence diagram illustrating an example of a gateway NE (GNE) candidate selection process performed by the EMS.

The load information of each of the NE 5 can be collected by using, for example, the health check signal. For example, as illustrated in FIG. 2, the EMS 3 is operable to periodically transmit the health check signal to the NEs 5 in order to monitor (or check) the "health" of the NEs 5 (Process P11).

Upon receiving the health check signal, the NE(s) 5 being alive transmits a response signal to the EMS 3 (Process P12). By setting the load information of the NE(s) 5 to the response signal, the EMS 3 is available to collect the load information of each of the NEs 5 in a health check sequence. The load information of each of the NEs 5 may be collected by using another sequence different from the health check sequence.

Then, for example, the EMS 3 repeatedly performs a process of: determining (or selecting) a GNE candidate of an NE 5 with the lowest load level equal to or less than the predetermined threshold value; excluding the NEs 5 having the connection relation to the determined NE 5 with the X2 interface from the sorted list; and selecting another GNE candidate from the remaining NEs 5.

In this way, the NEs 5 which are connected by the X2 interface are grouped into a management group (which may be referred to as an NE group) and an NE 5 having the lowest load level equal to or less than the threshold value in the NE group is selected as the GNE candidate (Process P13). For example, in FIG. 1, the NEs 5-1 to 5-4 are grouped into the NE group #1 and the NEs 5-5 to 5-8 are grouped into the NE group #2. Further, in FIG. 2, the NE 5-3 (NE#C) is selected as the GNE candidate.

Thereafter, the EMS 3 notifies the selected NE 5 (for example, NE#C) that the NE 5 is the GNE candidate (Process P14 in FIG. 2). The notification (GNE candidate notification) is an example of a notification signal to notify the NE 5 that the NE 5 has been selected as an NE 5 allowed to detect the abnormal state of the EMS 3. Upon receiving the GNE candidate notification, the NE 5 returns a response to the notification to the EMS 3 (Process P15 in FIG. 2). Upon receiving the response, the EMS 3 is operable to periodically notify the GNE candidate NE 5 of the load information of the EMS 3 (Process P16 in FIG. 2). The NE 5 of the GNE candidate activates (or enables) the monitoring of the reception of the health check signal from the EMS 3 (Process P17 in FIG. 2).

Figure 3:
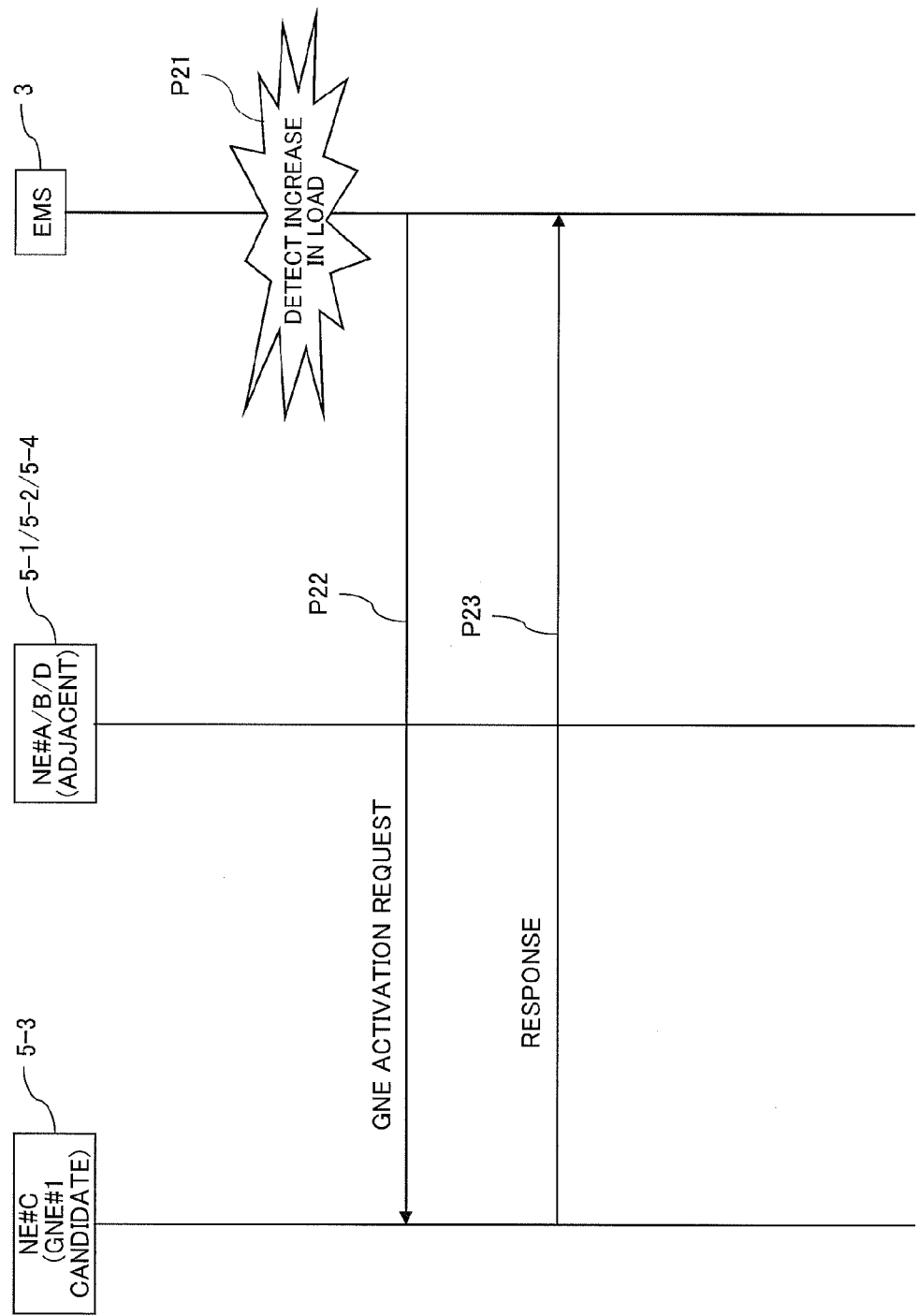
FIG. 3 is a sequence diagram illustrating an example of a process when the load of the EMS increases.

In the above situation, for example, it is assumed that the EMS 3 detects that the load level is greater than a predetermined threshold value (in other words, congestion occurs) (Process P21 in FIG. 3). In this case, the EMS 3 transmits a GNE activation request to the NE 5 (for example, NE#C) of the GNE candidate (Process P22 in FIG. 3). Upon receiving the GNE activation request, the NE 5 of the GNE candidate activates the GNE function and returns a response to the EMS 3 (Process P23 in FIG. 3). In other words, the GNE activation request is an example of a signal indicating that the load of the EMS 3 has exceeded the predetermined threshold value.

The EMS 3 may store stepwise load levels (for example, CPU utilization: 30%/50%/80%) and the allowable number of GNE to be activated (for example, 25%/50%/100% of the NEs to be managed) corresponding to each load level as processing conditions (or policy) in advance. In this case, when the load level reaches a defined threshold value as increasing the load, the EMS 3 selects one or more of the NEs 5 of the GNE candidate in the range of the corresponding allowable number of GNE and transmits the GNE activation request to the selected NE 5.

Figure 4:
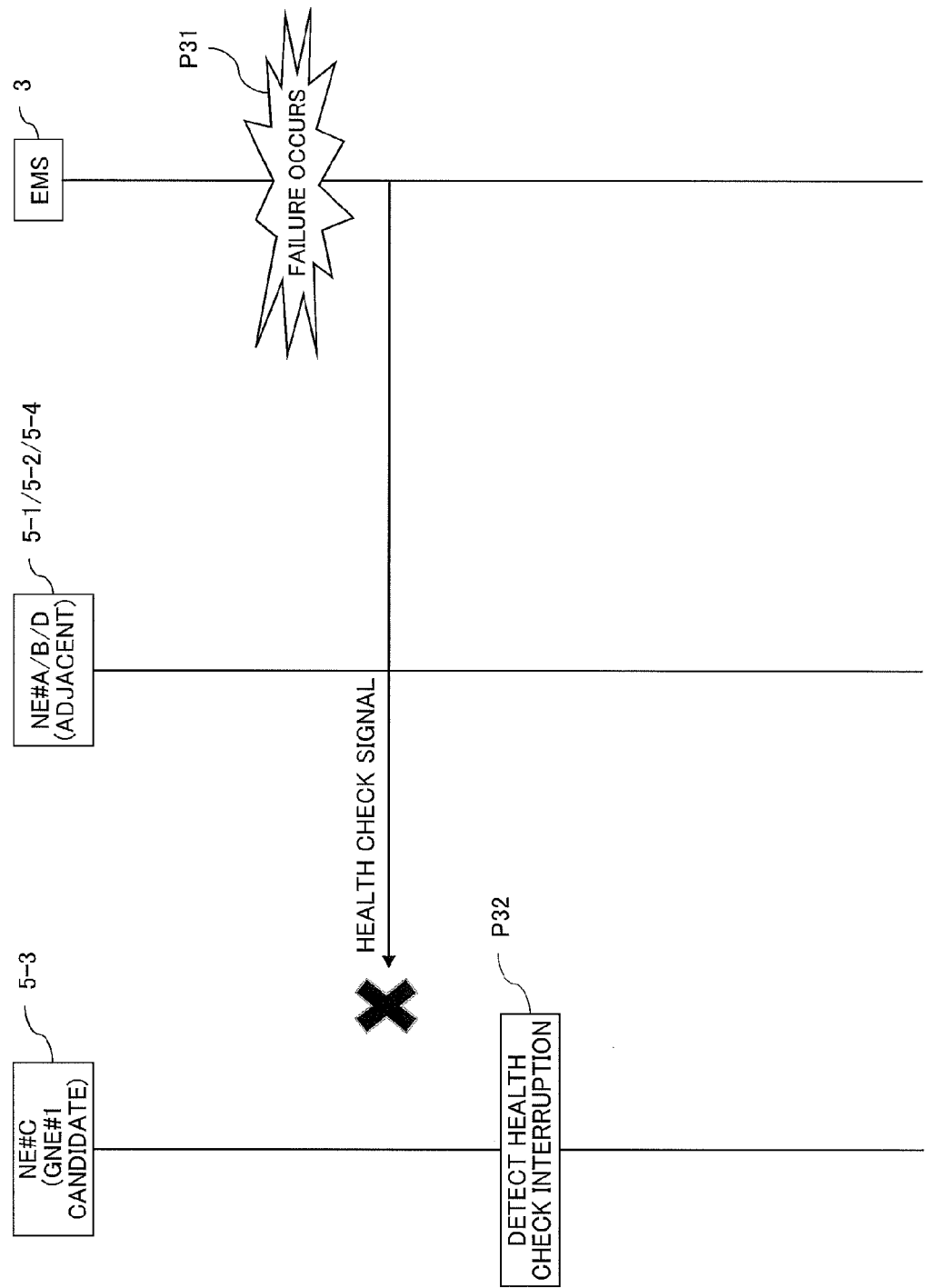
FIG. 4 is a sequence diagram illustrating an example of a process when a failure occurs in the EMS.

Meanwhile, as illustrated in FIG. 4, when a failure occurs in the EMS 3 (P31), the EMS 3 is no longer available to transmit the health check signal to the NE 5 of the GNE candidate. Therefore, the NE 5 of the GNE candidate is also no longer available to receive the health check signal in a predetermined period (health check interruption). In response to a detection of the health check interruption (Process P32), the NE 5 of the GNE candidate determines that a failure or abnormality occurs in the EMS 3. There are some cases that the EMS 3 is unavailable to transmit the health check signal to the NE 5 of the GNE candidate in a predetermined period due to an increase in the load of the EMS 3.

Figure 5:
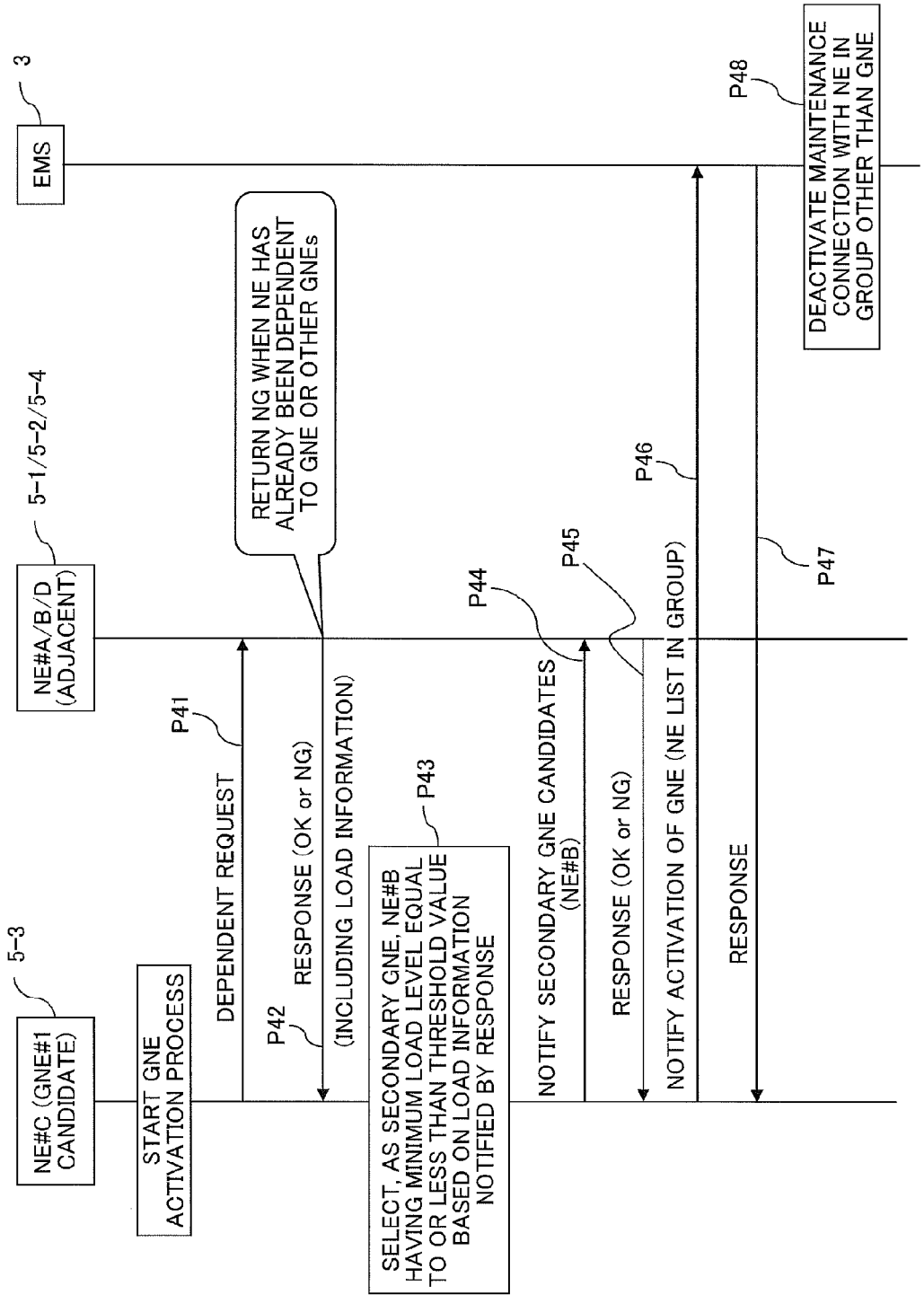
FIG. 5 is a sequence diagram illustrating an example of an autonomous management group (NE group) build process performed by a GNE when the load of the EMS increases or when a failure occurs in the EMS.

Upon receiving the GNE activation request from the EMS 3 or upon detecting the health check interruption, the NE 5 (for example, NE#C) of the GNE candidate is operable to perform the GNE activation process illustrated in FIG. 5.

For example, upon activating the GNE function, the NE#C (GNE#1) transmits, to the NEs 5 (for example, NE#A, NE#B, and NE#D) each having a connection relation to the NE#C with the X2 interface, a "dependent request" to check (or confirm) whether the NEs 5 is available to be dependent to the NE#C (Process P41). The dependent request may include the load information of GNE#1 which is a transmission source of the dependent request. The NE 5 receiving the dependent request transmits a response (an allowance (OK) or a rejection (NG)) to the dependent request to the source GNE#1 (Process P42). The response may include the load information of the NE 5 which has received the dependent request.

For example, the NE 5 which has received the dependent request may return the NG as a response (that is, rejects the dependent request), when the NE 5 has already served as the GNE. In addition, the NE 5 which has received the dependent request may return the NG, when the NE 5 has already been dependent to the GNE. In this case, the NE 5 may select any one of the GNEs, to which the NE 5 is dependent, having the lower load level based on the load information of the GNEs included in the dependent request received from each of the GNEs. Then, the NE 5 may return a dependent allowance signal (OK) to the selected GNE and may return a dependent rejection signal (NG) to the non-selected GNE.

Upon receiving the dependent request, the GNE#C determines one or more of NEs 5 to be dependent based on the response from the NEs 5 and activates (or sets) a maintenance connection(s) with the determined dependent NE(s) 5. Thereafter, the GNE#C notifies the EMS 3 of, for example, the completion of the start of the GNE and a list of the dependent NEs 5 (hereinafter, referred to as an "NE list") (GNE activation notification) (Process P46). The NE list may include identification information (NE-ID) for identifying the NE 5. Each of #A to #H may be considered as an example of the NE-ID.

When no failure occurs, the EMS 3 which has received the GNE activation notification may return a response to the GNE#C (Process P47) and deactivate (or release) the maintenance connection with the NE 5 identified by the NE-ID in the NE list notified by the GNE#C (Process P48). Therefore, the GNE activation notification may be considered as an example of a control signal including the NE-ID of a target maintenance connection to be deactivated (or released). The response to the GNE#C (Process P47) may be performed after the maintenance connection with the NE 5 in the NE list is deactivated.

Thereby, the EMS 3 is not available to perform a direct maintenance communication with the NE 5 dependent to the GNE#C. Instead, the maintenance communication for the NE 5 dependent to the GNE#C is performed through GNE#C.

For example, the EMS 3 sets the destination of the maintenance signal addressed to the NE 5 depending to the GNE#C to the GNE#C. The GNE#C identifies the NE 5 which is the transmission destination of the maintenance signal based on the NE-ID included in the maintenance signal received from the EMS 3, and transmits (or relays) the maintenance signal to the identified NE 5.

Meanwhile, the NE 5 dependent to the GNE#C sets the destination of the maintenance signal addressed to the EMS 3 to the GNE#C. The GNE#C transmits (or relays) the maintenance signal, which is addressed to the EMS 3 and received from the dependent NE 5, to the EMS 3.

Figure 6:
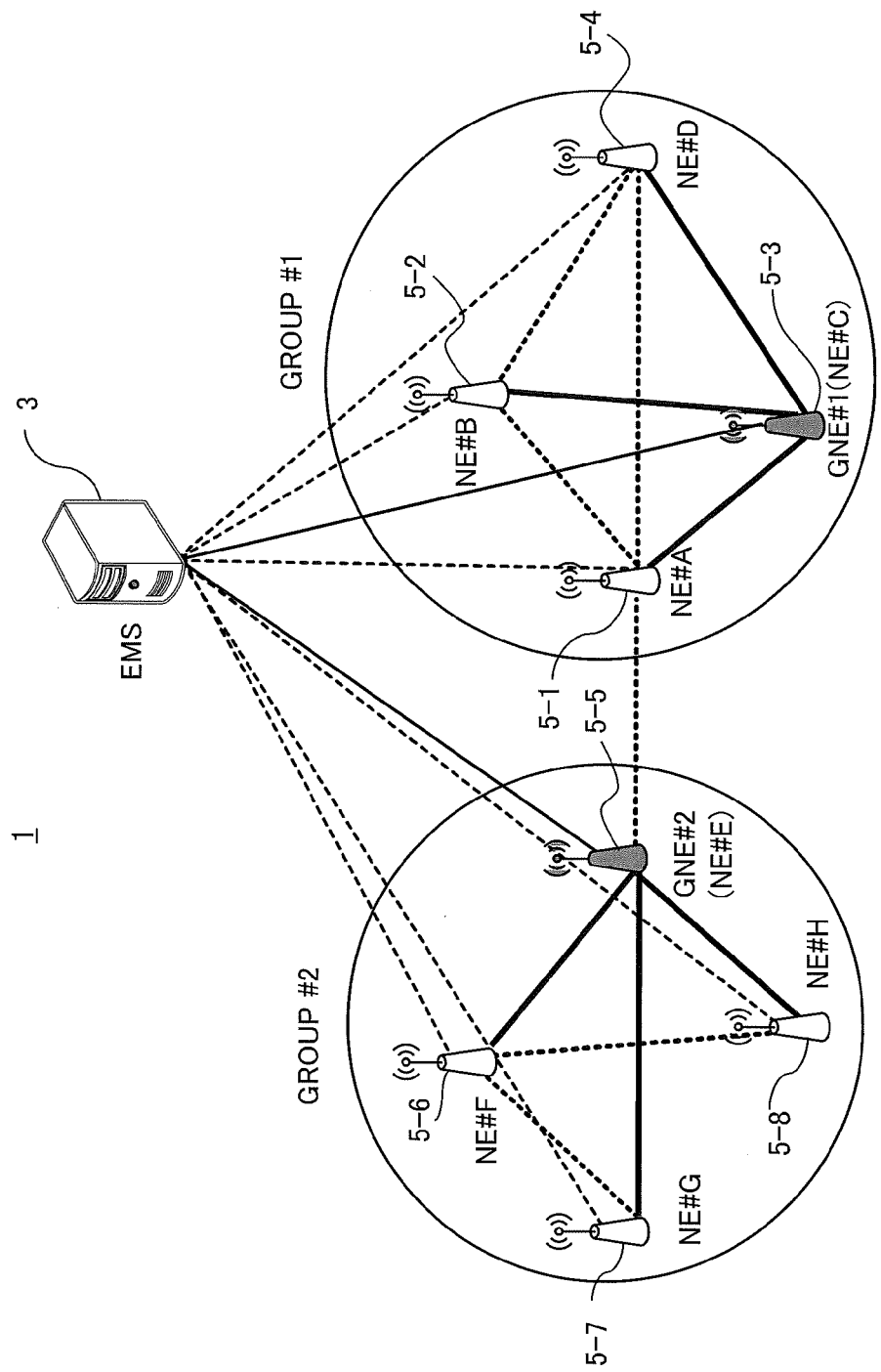
FIG. 6 is a diagram illustrating a change of the network topology when the GNE is activated (or enabled) in the network topology illustrated in FIG. 1.

As a result, for example, the connection relation (or network topology) illustrated in FIG. 6 is established. For example, in the NE group #1, the NE#C serves as the GNE#1 and activates the maintenance connections for the NE#A, NE#B, and NE#D dependent to the GNE#1 to establish a maintenance session in the maintenance connection (see a solid line). Meanwhile, the each of the maintenance connections between the EMS 3 and the NE#A, NE#B, and NE#D dependent to the GNE#1 is deactivated (see a dotted line).

The activation and deactivation of the maintenance connection is also applicable to the NE group #2. For example, as illustrated in FIG. 6, in the NE group #2, NE#E serves as GNE#2 and activates the maintenance connection for the NE#F, NE#G, and NE#H dependent to the GNE#2 (see a solid line). Meanwhile, the each of the maintenance connections between the EMS 3 and the NE#F, NE#G, and NE#H dependent to the GNE#2 is deactivated (see a dotted line). The GNE 5 is an example of a first NE and the NE(s) 5 dependent to the GNE 5 is an example of a second NE.

Thereby, since the management of the maintenance sessions are reduced by about 75% as compared to the network topology illustrated in FIG. 1, the EMS 3 can reduce the steady load caused by the subsequent maintenance communication. When a failure occurs in the EMS 3, since the EMS 3 is not available to receive an NE list of a target maintenance connection(s) to be deactivated from the GNE 5, the maintenance connection(s) with each of the NEs 5 is originally unavailable. In order to avoid the competition of activating the GNEs, the EMS 3 may exclude an NE 5 having a connection relation by the X2 interface with the NE 5 notified as the GNE candidate from the GNE candidates.

For example, the EMS 3 is operable to manage the connection relation between all of the NEs 5 to be monitored by using an EMS management table (connection relation list) 300 illustrated in FIG. 7. In the example illustrated in FIG. 7, upon transmitting the GNE candidate notification to the NE#C, the EMS 3 excludes the NE#A, NE#B, and NE#D having the connection relation to the NE#C from the GNE candidates in the EMS management table 300. Similarly, upon transmitting the GNE candidate notification to the NE#E, the EMS 3 excludes the NE#A, NE#F, NE#G, and NE#H having the connection relation to the NE#E from the GNE candidates in the EMS management table 300. The other NEs 5 are the GNE candidates.

As described above, when no abnormality occurs in the EMS 3 and the EMS 3 operates normally, the EMS 3 is operable to collect the load information of each of the NEs 5 and to select an NE 5 as the GNE 5 based on the collected load information. Then, the GNE 5 is operable to make the NE(s) 5 having the connection relation to the GNE 5 with the inter-NE interface dependent to the GNE 5 to autonomously form (or configure) the management group.

The EMS 3 is operable to sequentially select NE(s) 5 with the relatively lower load level among the NEs 5 not included in a management group as the GNE candidates and to notify the selected NE(s) 5 that the NE(s) 5 is selected as the GNE candidates. As such, by performing such selection of the GNE candidates periodically, the GNE candidate is adaptively changed (or re-selected) according to a change in the load of the NE 5.

When an abnormality such as an increase in load or a failure occurs in the EMS 3, the GNE 5 starts (or activates) the GNE function. The GNE function allows the GNE 5 to autonomously perform maintenance communication with the dependent NE(s) 5 on the behalf of the EMS 3. Thereby, it is possible to perform the minimal OAM which allows the NE(s) 5 to maintain a continuous service. In addition, since the number of NEs 5 to be monitored by the EMS 3 can be reduced, it is possible to reduce the load of the EMS 3.

The above-mentioned process can be implemented by cooperation between the software control functions of the EMS 3 and the NE 5. Therefore, the intervention of the maintainer is not needed to detect the abnormal state of the EMS 3 or to configure the management group.

Second Embodiment: GNE Change Control

As described above, in some cases, an abnormality occurs in the NE (may be referred to as a "primary GNE") 5 which is notified of the selection of the GNE candidate by the EMS 3. In this case, for example, another NE 5 which belongs to the same NE group as the primary GNE 5 may serve as a secondary GNE 5 and monitor the NEs 5 dependent to the primary GNE 5 on the behalf of the primary GNE. The secondary GNE 5 may be referred to as a standby GNE 5.

For example, the primary GNE 5 may select, as the secondary GNE 5, any one of the dependent NEs 5 having a connection relation to the primary GNE 5 with the X2 interface. The secondary GNE 5 is operable to monitor communication with the primary GNE 5 to monitor the state of the primary GNE 5. Upon detecting that an abnormality occurs in the primary GNE 5, the secondary GNE 5 is operable to make the primary GNE 5 and the NE(s) 5 dependent to the primary GNE 5 dependent to the secondary GNE 5. Thereby, the dependent relation (the setting of the maintenance connection) between the GNE 5 and the dependent NE(s) 5 in the NE group is changed and the secondary GNE 5 succeeds to the monitoring of the NEs 5 in the NE group.

Similarly to the selection of the primary GNE 5 by the EMS 3, the primary GNE 5 may collect the load information of the dependent NE(s) 5 and select the secondary GNE 5 based on the collected load information. For example, in the process of sequence illustrated in FIG. 5, the NE 5 dependent to the GNE#1 (NE#C) in the NE group #1 includes the load information of the GNE#1 into a response signal of the dependent request from the GNE#1 or into a response signal to the health check signal which is periodically transmitted from the GNE#1.

Thereby, the GNE#1 is operable to select, as the secondary GNE 5, an NE 5 (for example, NE#B) with load information indicating the lowest load level equal to or less than a threshold value among the dependent NEs 5 (NE#A, NE#B, and NE#D) (Process P43 in FIG. 5).

The GNE#1 transmits to the secondary GNE#B a secondary GNE candidate notification (Process P44 in FIG. 5). The notification may include the load information of the GNE#1. Upon receiving the notification, the secondary GNE#B returns a response to the primary GNE#1 (Process P45). The response may include the load information of the secondary GNE#B.

Thereafter, the secondary GNE#B monitors a reception of a GNE transfer request (or GNE activation request) and a periodic health check signal from NE#C which is the primary GNE#1. In this way, the same or similar relation as that between the EMS 3 and the GNE candidate is established (or configured) between the primary GNE#C and the secondary GNE#B.

For example, as illustrated in FIG. 11, the primary GNE#C is operable to periodically transmit the health check signal to the dependent NEs 5 including the secondary GNE#B (Process P51). The health check signal may include the load information of the primary GNE#C. Upon receiving the health check signal, the dependent NE 5 returns a response signal to the primary GNE#C (Process P52). The response signal may include the load information of the dependent NE 5.

Since the health check sequence is periodically repeated, the primary GNE#C may change the secondary GNE 5 according to a change in the load state of the dependent NEs 5. For example, upon detecting a change in the NE 5 with the lowest load level equal to or less than the threshold value based on the load information included in the response signal to the health check signal, the primary GNE#1 may change the secondary GNE 5 to the NE 5 with the lowest load level as new secondary GNE 5 (Process P53).

Then, the secondary GNE 5 (for example, NE#B) activates the GNE function upon receiving the GNE transfer request (or GNE activation request) from the primary GNE 5 (for example, NE#C) or upon detecting a failure of receiving the health check signal.

For example, as illustrated in FIG. 12, upon detecting a load increase exceeding the threshold value (Process P61), the primary GNE#C is operable to transmit the GNE transfer request to the secondary GNE#B (Process P62).

Upon receiving the GNE transfer request, the secondary GNE#B returns a response to the received request to the primary GNE#C (Process P63). In this case, the reception of the GNE transfer request allows the secondary GNE#B to recognize (or detect) that an abnormality (for example, a load increase) occurs in the primary GNE#C.

Figure 13:
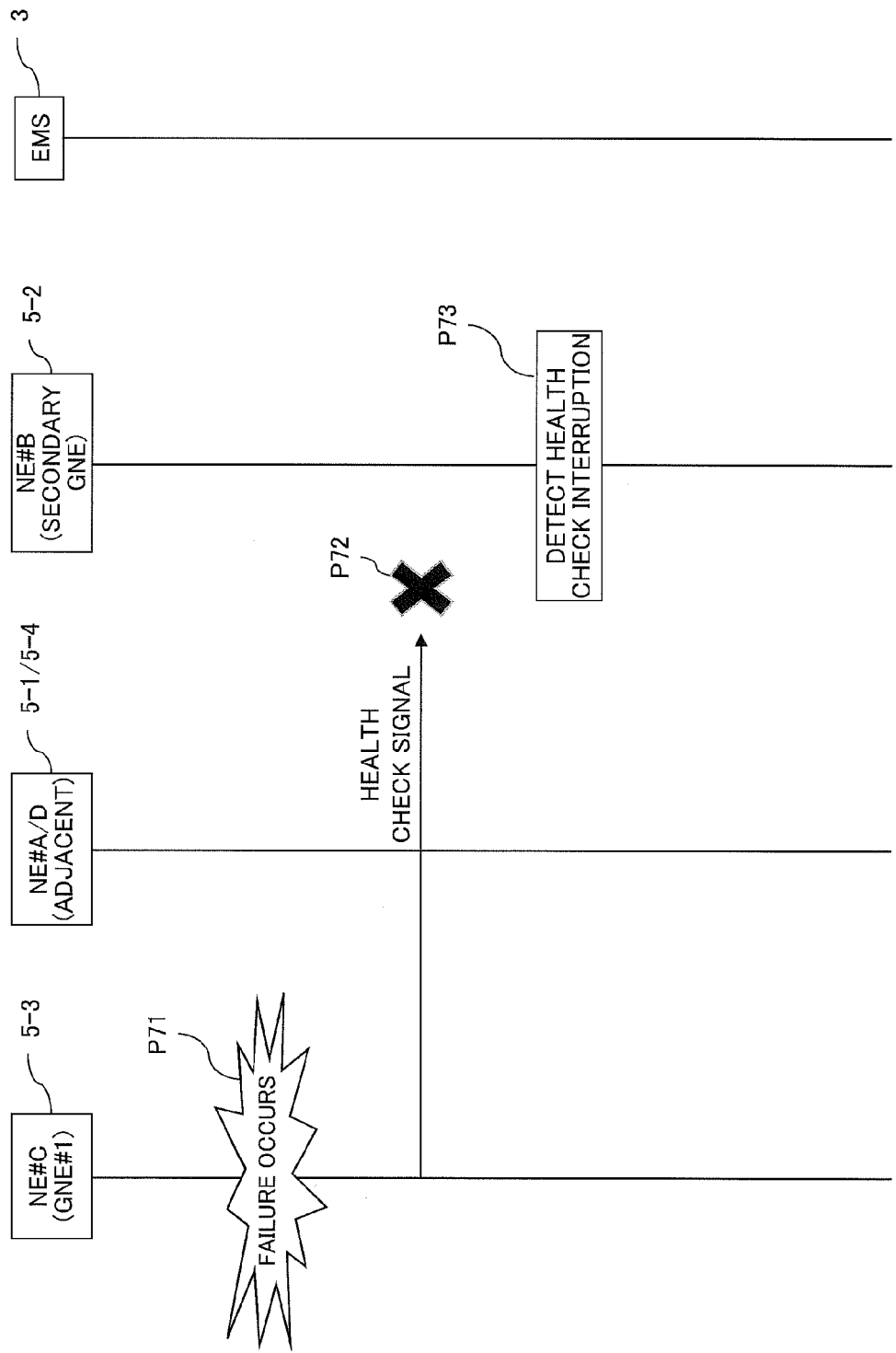
FIG. 13 is a sequence diagram illustrating an example of a process when a failure occurs in the primary GNE.

Further, as illustrated in FIG. 13, when a failure occurs in the primary GNE#C (Process P71) and the secondary GNE#B fails to receive the health check signal within a predetermined period (Process P72), for example, a health check interruption is detected (Process P73).

As described above, upon receiving the GNE transfer request or detecting the health check interruption to detect the abnormal state of the primary GNE#C, the secondary GNE#B is operable to activates the GNE activation process.

Figure 14:
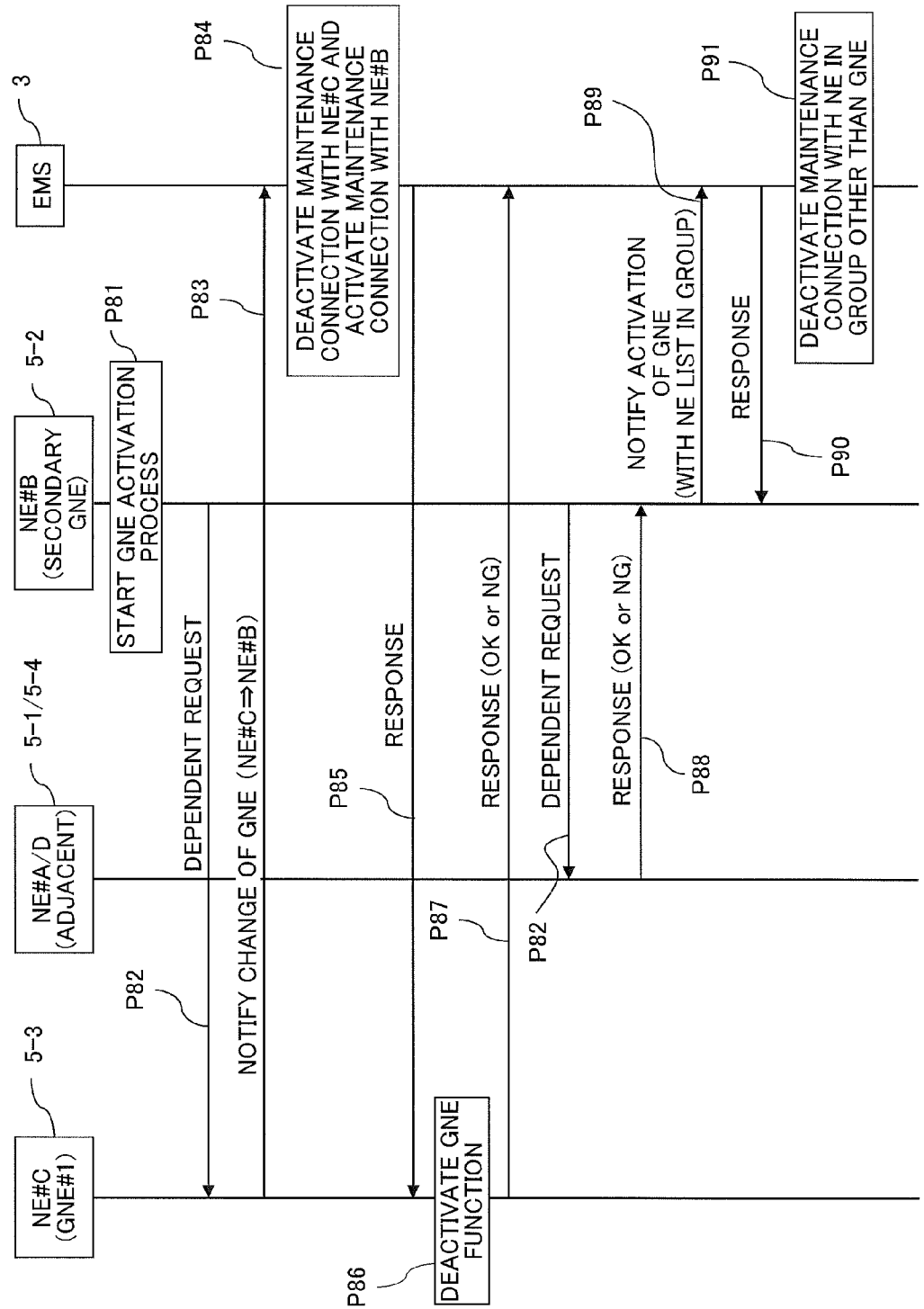
FIG. 14 is a sequence diagram illustrating an example of a process of changing the GNE which substitutively monitors the NE to the secondary GNE.

For example, as illustrated in FIG. 14, upon starting the GNE activation process (Process P81), the secondary GNE#B is operable to transmit a dependent request to the NE#A, NE#C, and NE#D having connection relations by the X2 interface with the GNE#B (Process P82).

When no failure occurs, the primary GNE#C receives the dependent request from the secondary GNE#B. Upon receiving the dependent request, the primary GNE#C transmits a GNE change notification indicating that the GNE 5 is changed from the NE#C to the NE#B to the EMS 3 (Process P83). The GNE change notification may include, for example, the NE-IDs for identifying the pre-changed and post changed GNEs 5.

Upon receiving the GNE change notification, the EMS 3 deactivates the maintenance connection with NE#C which is the pre-changed GNE 5, activates a maintenance connection with NE#B which is a new (post-changed) GNE 5 (Process P84), and returns a response to the NE#C (Process P85). The GNE change notification is an example of a control signal to control the maintenance connection between the EMS 3 and the pre-changed and post-changed GNEs 5 in response to the change in the GNE 5.

Upon receiving the response from the EMS 3, the NE#C deactivates the GNE function (Process P86) and transmits a response (OK or NG) to the secondary GNE 5 (NE#B) which is the transmission source of the dependent request (Process P87).

Upon receiving the dependent request from the secondary GNE#B, the NE#A and NE#D which are not the GNE returns a response (OK or NG) to the secondary GNE#B (Process P88). For example, when the NE#A and NE#D have already been selected as the GNE 5 or when the NE#A and NE#D have already been dependent to the other GNE(s) 5, they return NG as the response (reject the dependent request).

When the response to the dependent request is received from each of the NE#A, NE#C, and NE#D, the secondary GNE#B activates maintenance connections with NE#A, NE#C, and NE#D and transmits a GNE activation notification to the EMS 3 (Process P89). The GNE activation notification may include, for example, a list of the NEs 5 which are dependent to the secondary GNE#B. For example, the NE list may include the NE-ID of each of NE#A, NE#C, and NE#D.

Upon receiving the GNE activation notification from the NE#B which is the new GNE 5, the EMS 3 returns a response to the NE#B (Process P90) and deactivates maintenance connections with the NEs 5 listed in the NE list that is included in the GNE activation notification (Process P91). Therefore, the GNE activation notification is an example of a control signal including the NE-ID to identify a maintenance connection to be deactivated (or released). The response to the NE#B (Process P90) may be transmitted after the maintenance connection(s) with the NE(s) 5 listed in the NE list is deactivated.

Thereby, the direct maintenance communication of the EMS 3 with the NE(s) 5 listed in the NE list is disabled and maintenance communication with the NE(s) 5 listed in the NE list is performed through the secondary GNE#B.

For example, the EMS 3 is operable to set the destination of the maintenance signal addressed to the NE 5 depending to the secondary GNE#B to the GNE#B. The GNE#B identifies the NE 5, which is the transmission destination of the maintenance signal, based on, for example, the NE-ID included in the maintenance signal received from the EMS 3 and to transmit (or relay) the maintenance signal.

Meanwhile, the NE 5 dependent to the GNE#B is operable to set the destination of the maintenance signal addressed to the EMS 3 to the GNE#B. The GNE#B is operable to transmit (or relay) the received maintenance signal addressed to the EMS 3 received from the dependent NE 5 to the EMS 3.

Figure 8:
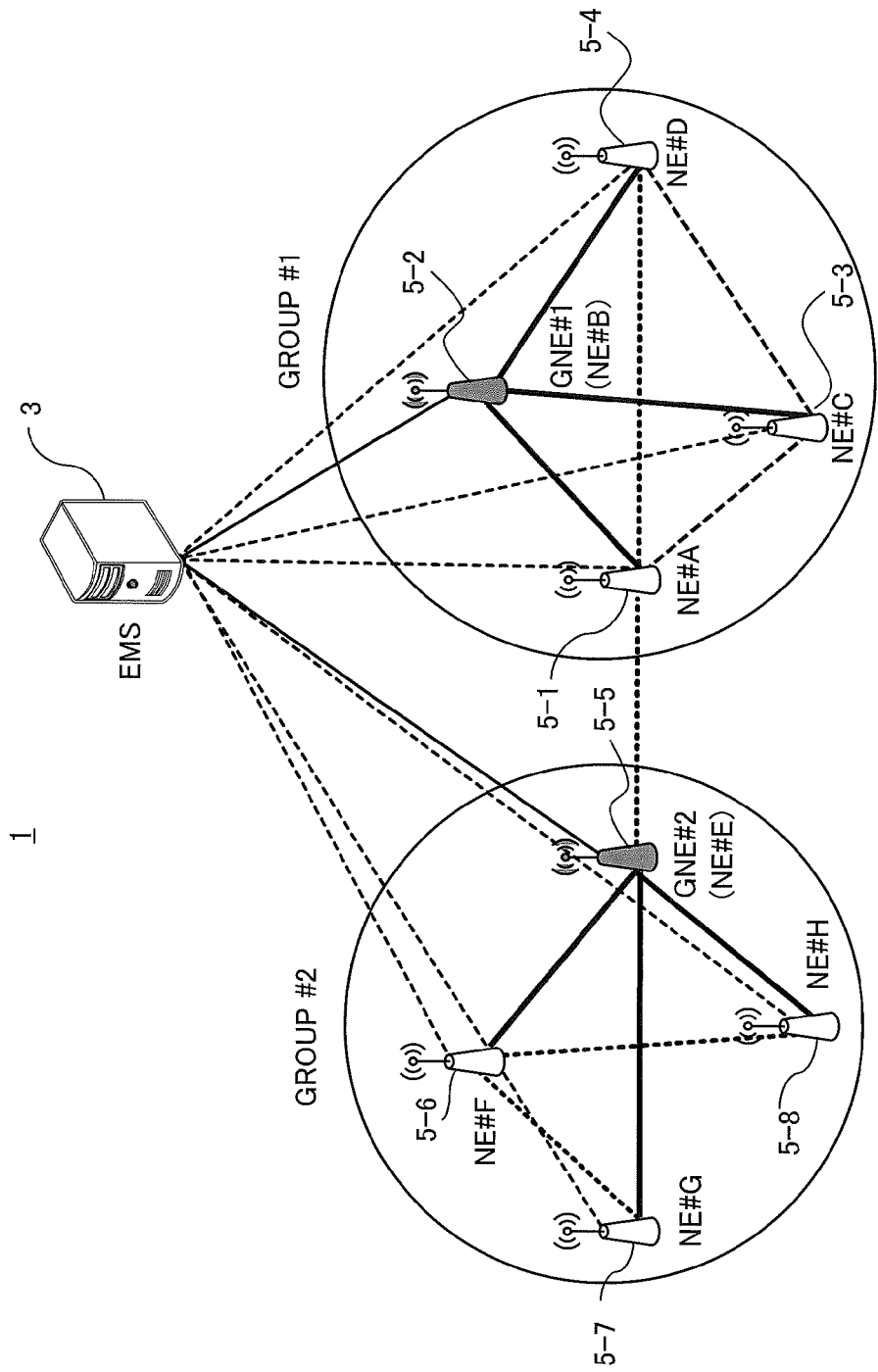
FIG. 8 is a diagram illustrating a change of the network topology when the GNE which substitutively monitors an NE is changed to a secondary GNE in the network topology illustrated in FIG. 6.

With the above process, the network topology illustrated in FIG. 6 is changed to the network topology illustrated in FIG. 8. In the example illustrated in FIG. 8, the maintenance connection between the EMS 3 and the NE#C which is the old GNE 5 is deactivated and the maintenance connection between the EMS 3 and the NE#B which is a new GNE 5 is alternatively activated. Further, in response to the dependent request transmitted from the NE#B which is a new GNE 5, the NE#A, NE#C, and NE#D become dependent to the new GNE#B and the maintenance connection between the new GNE#B and each of the NE#A, NE#C, and NE#D is activated (or enabled).

In this way, the GNE 5 is rapidly and autonomously changed between the NEs 5 in the NE group #1 and an OAM signal communication is available between the EMS 3 and the new GNE#B and between the GNE#B and the dependent NE 5.

Figure 9:
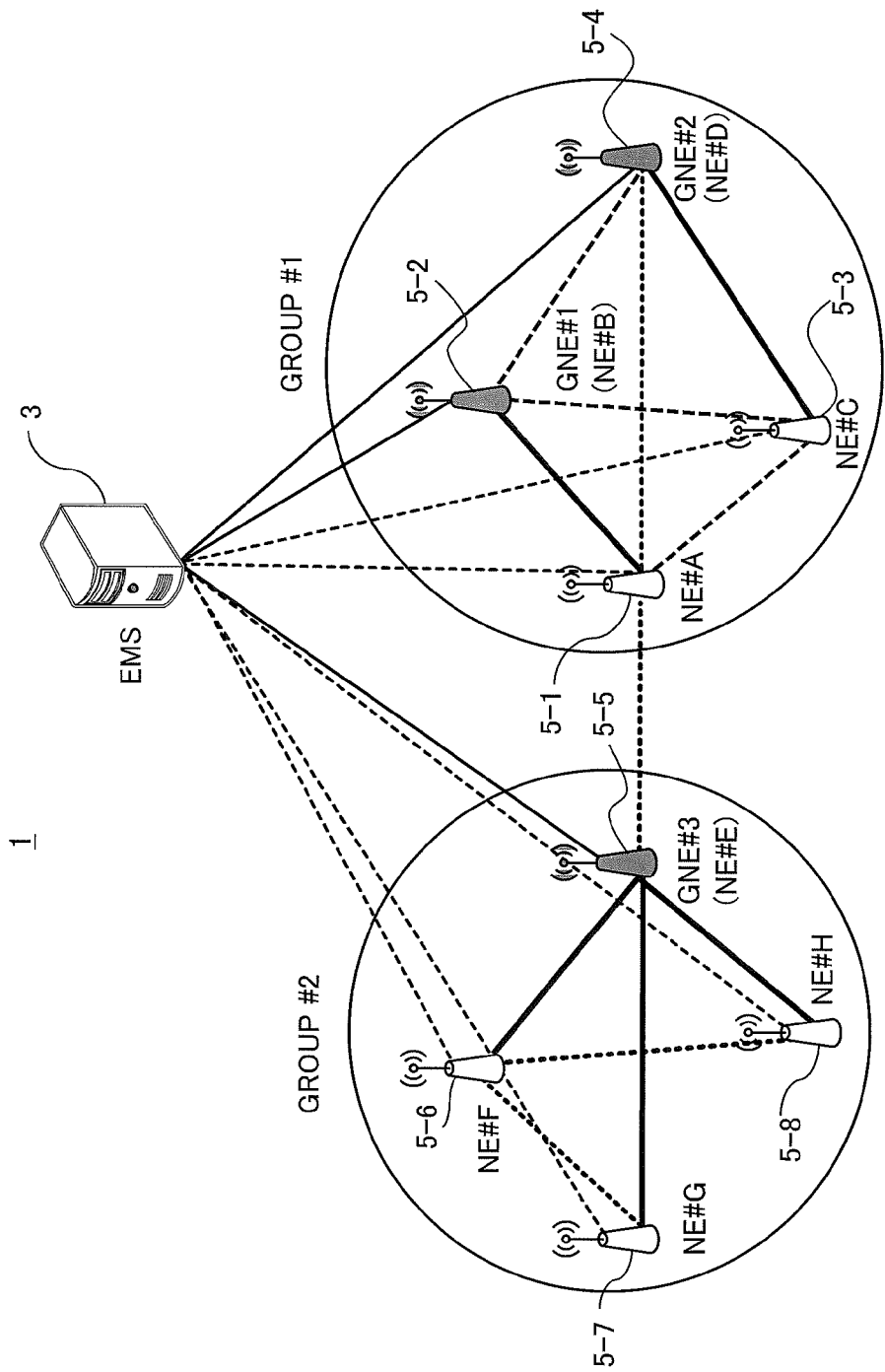
FIG. 9 is a diagram illustrating a change of the network topology when the GNE which substitutively monitors the NE is changed to a plurality of secondary GNEs in the network topology illustrated in FIG. 6 or FIG. 8.

When the primary GNE 5 tries to select the secondary GNE 5, there may be no NE 5 having a load level equal to or less than the threshold value among the dependent NEs 5. In this case, as illustrated in FIG. 9, a plurality of NEs 5 (for example, the NE#B and NE#D) in the same NE group (for example, the NE group #1) may be set as the secondary GNEs 5 to distribute the load, for example. Further in this case, a plurality of sub-groups corresponding to the plurality of secondary GNEs 5 may be configured in the same NE group. Thereby, the load is distributed to the plurality of sub-groups.

Further, when the load of any one of the plurality of GNEs is reduced, for example, the GNE 5 (for example, the NE#B) with the reduced load may notify another GNE 5 (for example, the NE#D) of the state of the NE#B. Upon receiving the notification, the GNE#D may deactivate its GNE function and may be dependent to the GNE#B with the reduced load. In this case, as illustrated in FIG. 8, the NE group #1 is possible to return to the network topology including a single GNE#B.

The NE 5 is available to manage the other NEs 5 connected thereto with the X2 interface by using a management table similar to the EMS management table 300 illustrated in FIG. 7. For example, the NE 5 stores a management table 500 illustrated in FIG. 10 which is obtained by extending the management information. The NE 5 manages the state of the GNE 5 and a dependent relation for each of the other NEs 5 having a connection relation therewith. The management table 500 may be referred to as a connection relation list 500.

The management table 500 illustrated in FIG. 10 is an example of the management table 500 stored by the NE#A. (A) of FIG. 10 illustrates management information before the activation of the GNE 5 illustrated in FIG. 1, (B) of FIG. 10 illustrates management information after the activation of the GNE 5 illustrated in FIG. 6, and (C) of FIG. 10 illustrates management information after a load increase in the current GNE illustrated in FIG. 8 (transfer to a single secondary GNE).

(A) of FIG. 10 illustrates a state where the EMS 3 normally performs maintenance communication with each of the NEs 5. In this case, there is no NE 5 whose "GNE state" is "On" (started or activated) among the NE#B to NE#E and the maintenance connections with the EMS 3 are active (or available).

Thereafter, when an abnormality occurs in the EMS 3, the management information is changed as illustrated in (B) of FIG. 10. In (B) of FIG. 10, the "GNE state" of each of the NE#C and NE#E is turned "On" and each of the NE#C and NE#E serves as the GNE 5 and holds (or maintains) the maintenance connection with the EMS 3. Since the NE#A is dependent to the GNE#C, the "dependent relation" with the NE#C is turned "On" indicating dependence in the management table 500. An OAM is performed on the NE#A, NE#B, and NE#D which are dependent to the GNE#C by the maintenance connections between GNE#C and each of the NE#A, NE#B, and NE#D, as described above.

In (B) of FIG. 10, the NE#E having a connection relation with the NE#A is set as the GNE 5 in the NE group #2. Therefore, the NE#A is possible to select one of the NE#C and NE#E as a dependent destination.

For example, in a case where the NE#E in the NE group #2 is set as the GNE 5 at the beginning, the NE#A is dependent to the NE#E at the time when the NE#E transmits a dependent request to the NE#A. Therefore, in the management table 500 of the NE#A, the "dependent relation" with the NE#E is turned "On".

Thereafter, when the NE#C is set as the GNE 5 in the NE group #1, the NE#A is available to receive the dependent request from the NE#C again. At that time, the NE#A is operable to compare load information notified by the dependent request from the NE#C and load information notified by the health check signal from the GNE#E which is the current dependence destination.

As a result, for example, the NE#A is operable to select an NE 5 (in this example, the NE#C) having the load information indicating the relatively lower load level as the dependence destination, and the dependent relation with the NE#C is established. Thereby, in the management table 500 of the NE#A, the "dependent relation" with the NE#E is turned "Off" and the "dependent relation" with the NE#C is turned "On". (B) of FIG. 10 illustrates this state.

(C) of FIG. 10 illustrates the management information of the management table 500 when an abnormality occurs in the GNE#C and the GNE 5 is changed to the secondary GNE#B in the same NE group #1.

In this example, when the abnormal state of the GNE#C is detected, the GNE 5 changes from the GNE#C to the NE#B since the NE#B has the lowest load level. Therefore, in the management table 500, the "GNE state" of the NE#C is changed from "On" to "Off" and the "dependent relation" between the NE#A and the NE#C is changed from "On" to "Off". In addition, the "GNE state" of the NE#B is changed from "Off" to "On" and the "dependent relation" between the NE#A and the NE#B is changed from "Off" to "On".

The GNE 5 may store, as processing conditions (policy), the threshold value of the load level (for example, CPU utilization: 70%) which triggers a GNE change. The GNE 5 transmits the GNE transfer request to the secondary GNE 5 upon detecting that the load level of the GNE 5 is greater than the threshold value.

Figure 15:
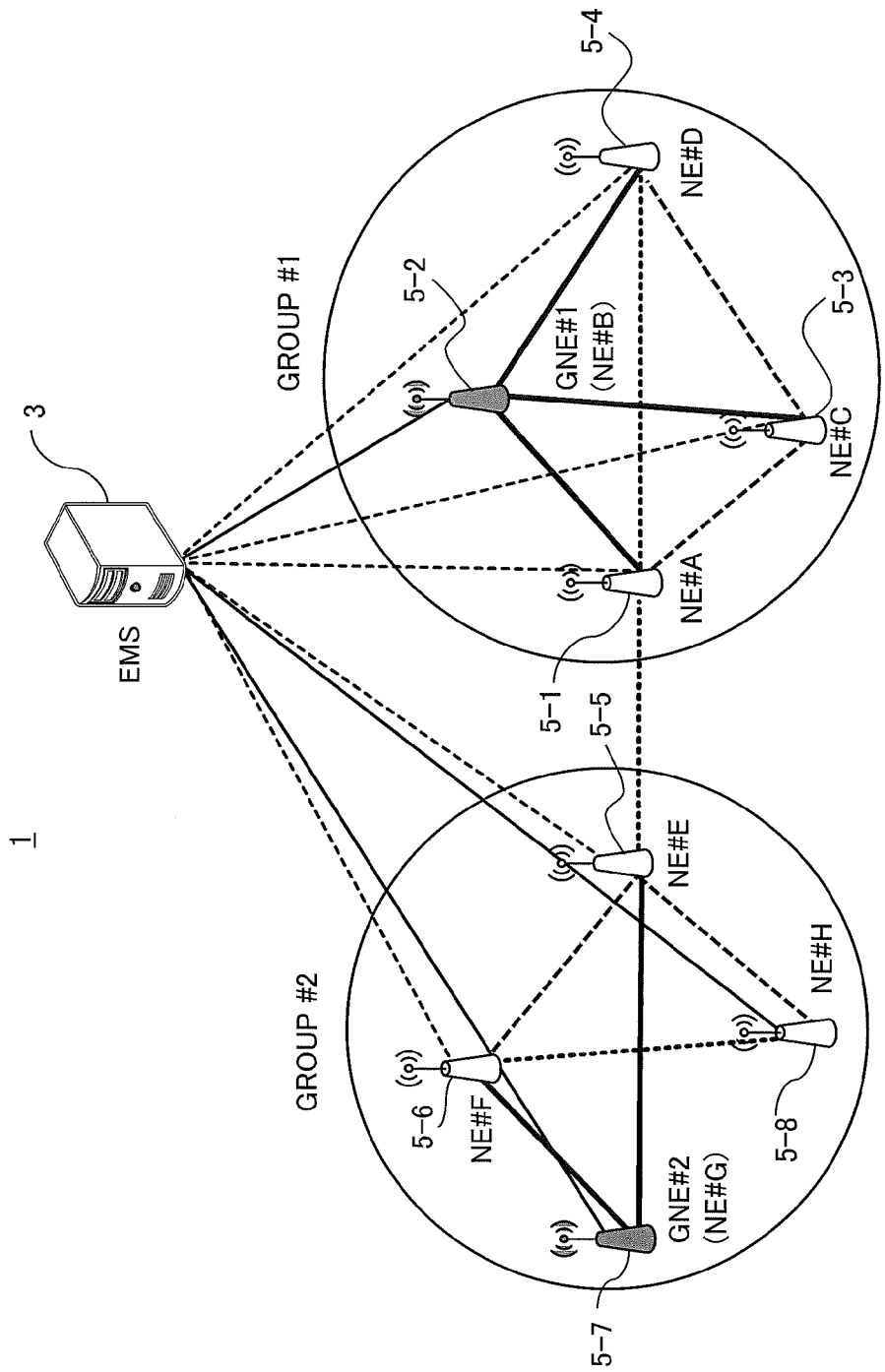
FIG. 15 is a diagram illustrating an example of the network topology when an NE which lost the dependent relation due to the process illustrated in FIG. 14 become dependent to (returns to the dependent of) the EMS.

Then, as illustrated in FIG. 15, it is assumed that the GNE 5 is changed from the NE#E to the secondary GNE#2 (NE#G) in the NE group #2, for example. In this case, since there is no connection by the X2 interface between the NE#G and the NE#H, no maintenance connection is also established, and the NE#H is isolated. The NE#H is an example of a third NE that is communicably connected to the old GNE#E with the X2 interface but is not communicably connected to the secondary GNE#G with the X2 interface.

In this case, the NE#H is possible to detect a health check interruption between the NE#H and the pre-changed GNE#E. Here, the NE#H requests the EMS 3 to activate the maintenance connection between the NE#H and the EMS 3 when a dependent request is not received from a new GNE#2 after the health check interruption is detected and there is no GNE 5 among other NEs 5 connected thereto. For example, the NE#H transmits a magic packet to the opposite IP address of the maintenance connection having been deactivated by the EMS 3.

Upon receiving the magic packet, the EMS 3 detects that an emergency occurs in the OAM of the NE#H which is the transmission source of the magic packet, and activates a maintenance connection with the NE#H (see a solid line between the EMS 3 and the NE#H in FIG. 15). Thereby, the OAM of the NE#H which is not dependent to the new GNE#G is continued by the EMS 3.

In a full-mesh network topology configured by using the X2 interface, such as the NE group #1, even when any of the NEs 5 is set as the GNE 5, the dependent relation is not lost originally. However, even in the full-mesh network topology, there is a case where the dependent relation is lost depending on operation conditions, such as conditions that a part of X2 interfaces is restricted for a handover.

When a GNE 5 in another NE group is present in the other NEs 5 connected to the connection-lost NE 5 with the X2 interface, the connection-lost NE 5 may be dependent to the GNE 5 in the other NE group. When there is no other GNE 5, the connection-lost NE 5 is allowed to become dependent (or return) to the EMS 3, similarly to the case of the NE#H.

However, as illustrated in FIG. 9, a plurality of secondary GNEs 5 may be provided in order to avoid the NE from returning to the dependents of the EMS 3, regardless of the load information of the secondary GNE 5. In the example illustrated in FIG. 15, when the NE#H judges to return to the EMS 3 and the load level thereof (NE#H) is equal to or less than the threshold value, the NE#H is available to become a GNE 5 itself.

In this case, unlike the processing sequence (Processing P83) illustrated in FIG. 14, the notification of a GNE change from the current GNE (NE#C) to the EMS 3 may be unperformed. Therefore, as described above, the NE#H may activate the maintenance connection with the EMS 3 by using, for example, the magic packet and then may transmit the GNE activation notification to the EMS 3.

As described above, even when an abnormality occurs in the GNE 5 after the GNE 5 is activated, a software control cooperation between the NEs 5 makes it possible to autonomously select a new GNE 5 among from the NEs 5 which operate normally in the NE group, without the intervention of the maintainer. Therefore, the above-described embodiment achieve a technical advantage in that an CAM for the NE 5 is not hindered or interrupted.

Third Embodiment: GNE Function Release

Next, a GNE function deactivation process when the abnormal state of the EMS 3 is recovered (for example, when the failure of the EMS 3 is recovered or when a load is reduced) will be described.

(Whole Deactivation Process)

When the failure of the EMS 3 is recovered, the EMS 3 may be considered as being in a state immediately after it restarts. Therefore, the EMS 3 may be considered as being in the lowest load level. When the failure of the EMS 3 is recovered, the EMS 3 resumes a health check sequence.

Figure 16:
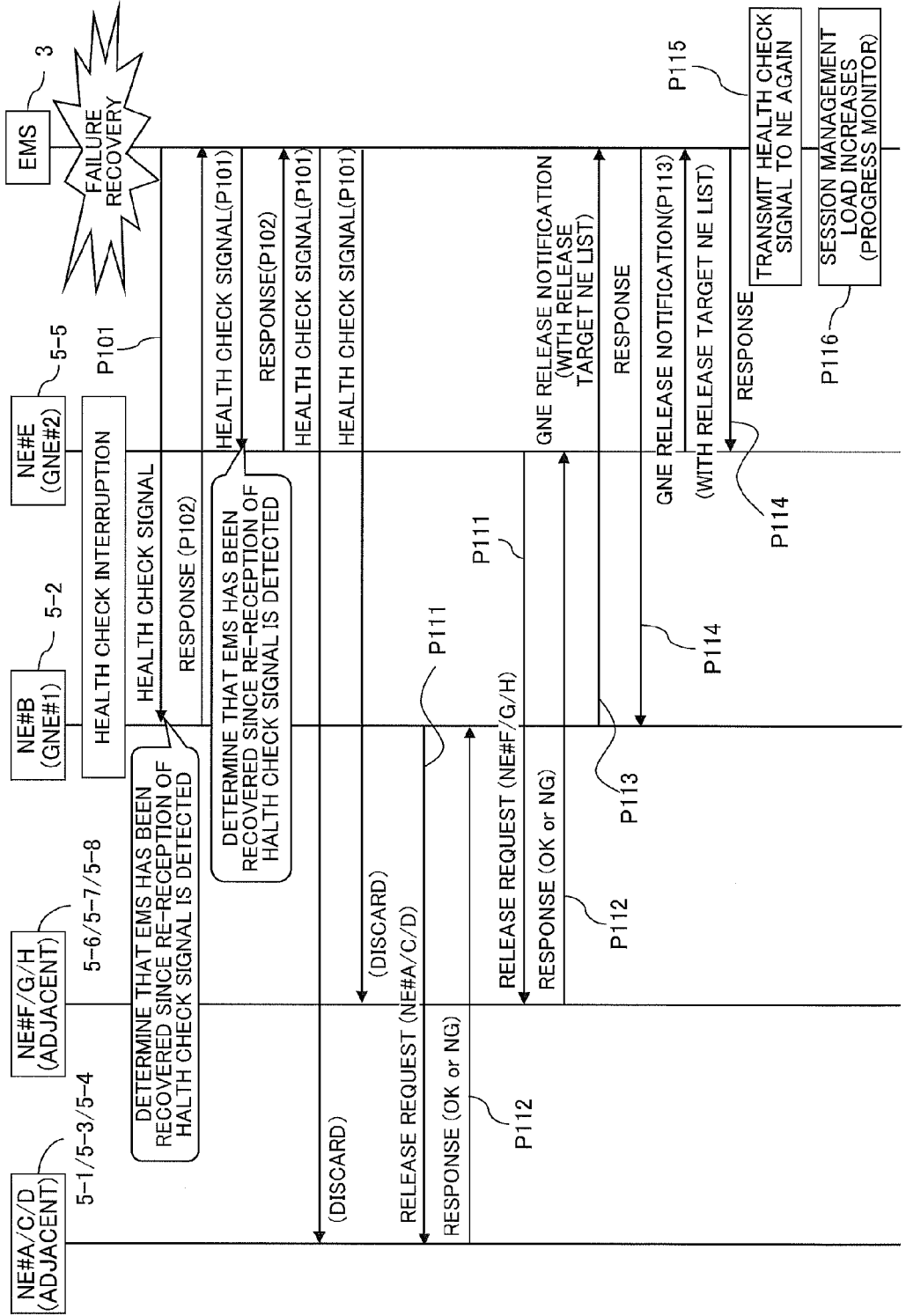
FIG. 16 is a sequence diagram illustrating an example of a process when the dependent relation between the GNE and the dependent NEs is cancelled (or deactivated) in response to the recovery of the failure of the EMS and the NE becomes dependent to (returns to the dependent of) the EMS.

For example, it is assumed that the NE group #1 includes a plurality of the GNE#1 (NE#B) and GNE#2 (NE#E), a failure occurs in the EMS 3, and the failure is recovered, as illustrated in FIG. 9. In this case, as illustrated in FIG. 16, all of the NEs 5 including the GNE#1 and the GNE#2 are available to receive a health check signal from the EMS 3 (Process P101). Therefore, the GNE#1 and the GNE#2 determine that the failure of the EMS 3 has recovered and transmit a response to the received health check signal to the EMS 3 (Process P102).

Meanwhile, all of the dependent NEs 5 do not return a response to the received health check signal until the current dependent relation is released (or deactivated). The dependent NEs 5 may discard the received health check signal. Then, the GNE#1 and the GNE#2 perform a process with, for example, a release ratio of 100% (i.e., all of the dependent relations are released).

When the release ratio is 100%, as a non-limiting example, all of the NEs 5 dependent to the GNE#1 and the GNE#2 return to the dependents of the EMS 3. For example, the GNE#1 transmits a release (deactivation) request to all of the NE#A, NE#C, and NE#D which are the dependent NEs 5. Similarly, the GNE#2 transmits a release (deactivation) request to all of the NE#F, NE#G and NE#H which are the dependent NEs 5 (Process P111).

Upon receiving the release request, the NE 5 returns a response (OK or NG) to the GNE#1 or GNE#2 which is the transmission source of the release request (Process P112). For example, when the NE 5 having received the release request has already been selected as the GNE 5, an NG is returned as the response. Each of the GNE#1 and GNE#2 having received the response to the release request is operable to transmit to the EMS 3 a GNE release notification including an NE list of the NEs 5 which have returned an OK as the response (Process P113).

When no response is received from the NE 5, the EMS 3 may generally determine that a failure occurs in the NE 5. However, after the failure is recovered, taking into consideration the existence of the GNEs, the EMS 3 receives the GNE release notification from each of the GNE#1 and GNE#2 to confirm the existence of the dependent NE(s) 5, and returns a response to each of the GNE#1 and GNE#2 (Process P114).

Then, the EMS 3 identifies the release target NEs 5 based on the NE list included in the received GNE release notification, transmits the health check signal to the identified NEs 5 again. The EMS 3 then confirms the return of a response to confirm the health (or normality) of the NEs 5 (Process P115). Therefore, the GNE release notification may be considered as an example of a control signal confirm (or determine or identify) the GNE and the dependent NEs 5 which are configured during the failure. A response to the GNE release notification may be transmitted after the health check signal is transmitted to the NE 5.

Thereby, the EMS 3 is available to perform direct maintenance communication with the NEs 5 listed in the NE list, without passing through the GNE 5, and the load of the session management in the EMS 3 increases. The EMS 3 monitors a change in the load level thereof (progress monitor) (Process P116). When the load level is greater than a threshold value, the EMS 3 performs the GNE activation process again, as illustrated in FIGS. 3 and 5.

(Stepwise Deactivation Process)

Meanwhile, when the load of the EMS 3 reduces, a GNE stepwise release (deactivation) process may be performed.

For example, the NEs 5 allowed to return to the dependents of the EMS 3 may be designated by the EMS 3 in stages according to the load level of the EMS 3. For example, the EMS 3 designates the number of NEs 5 allowed to return to the dependents of the EMS 3 with respect to the GNEs 5 to be released with the release ratio. The release ratio may be designated in the range of, for example, 1% to 100% for each NE group.

As a non-limiting example, the EMS 3 stores an average load level required for management per NE 5 and is operable to calculate, based on the average load level, the number of NEs 5 which causes a load increase from the current load level but the increased load level does not exceed the threshold value, when the load level of the EMS 3 is less than the threshold value.

The EMS 3 makes the GNE 5 and its dependent NEs 5 returned to the dependents of the EMS 3 in the range equal to or less than the calculated number of the NEs 5 for each NE group. When there are a large number of the NEs 5 in each NE group, the number of NEs 5 returnable to the dependents of the EMS 3 may be limited to a part of the NE group, according to the calculated number of the NEs 5.

In this case, the EMS 3 designates the number of NEs 5 returnable to the dependents of the EMS 3 as the release ratio in the NE group to the GNE 5. Therefore, the GNE 5 releases the dependencies of the dependent NEs 5 according to the designated release ratio.

The EMS 3 is operable to set a plurality of load levels for determining a reduction in load of itself and to instruct a stepwise release (return to the EMS 3) corresponding to each of the load levels. The stepwise release makes it possible to prevent the risk of a rapid increase in the load of the EMS 3 when the dependencies of the NEs 5 are released at once.

Figure 17:
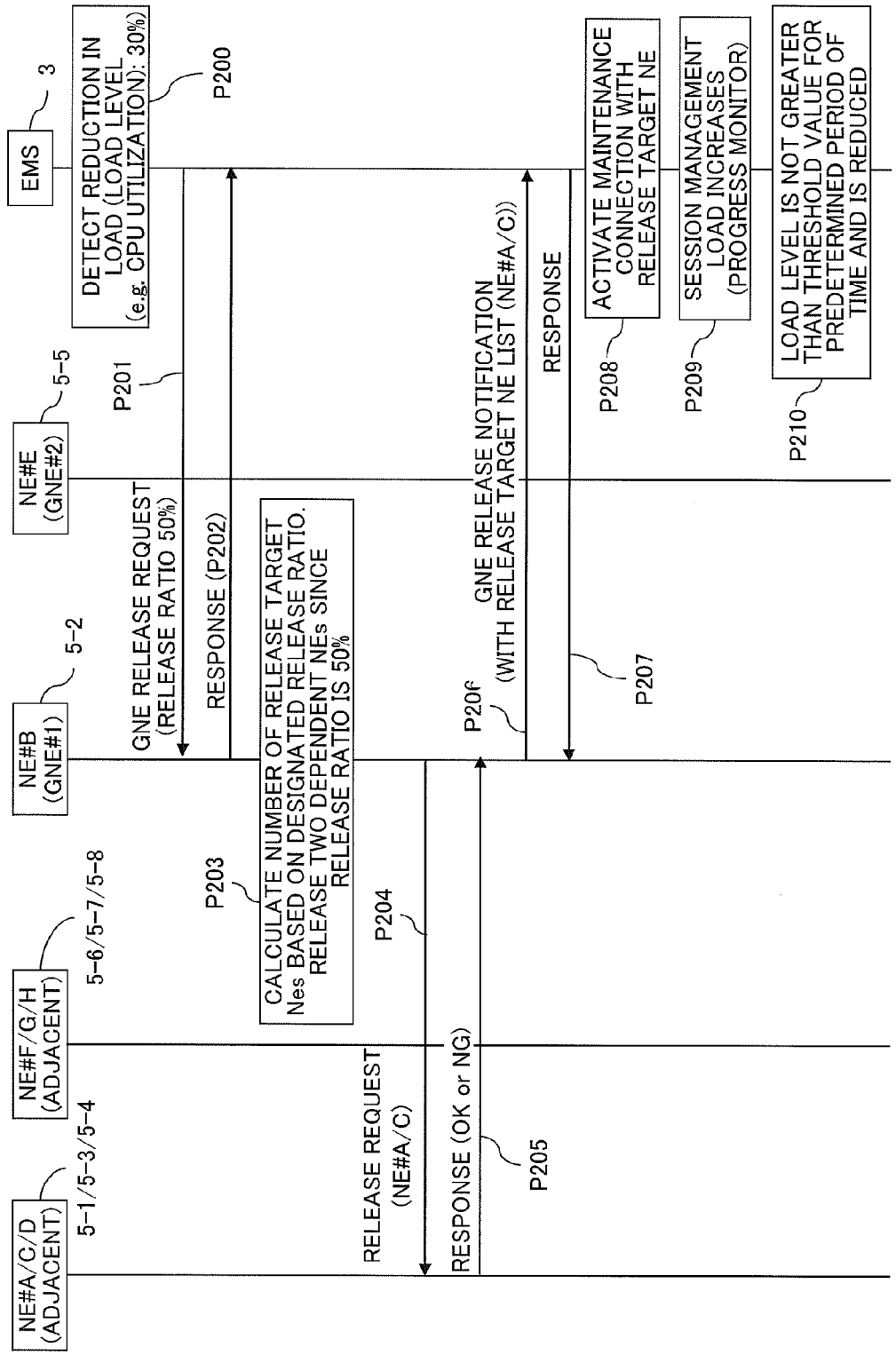
FIGS. 17 to 19 are sequence diagrams illustrating examples of a process of cancelling (or deactivating) the dependent relation between the GNE and the dependent NEs in stages in response to a reduction in the load of the EMS to return the NEs to the dependents of the EMS in stages.
Figure 18:
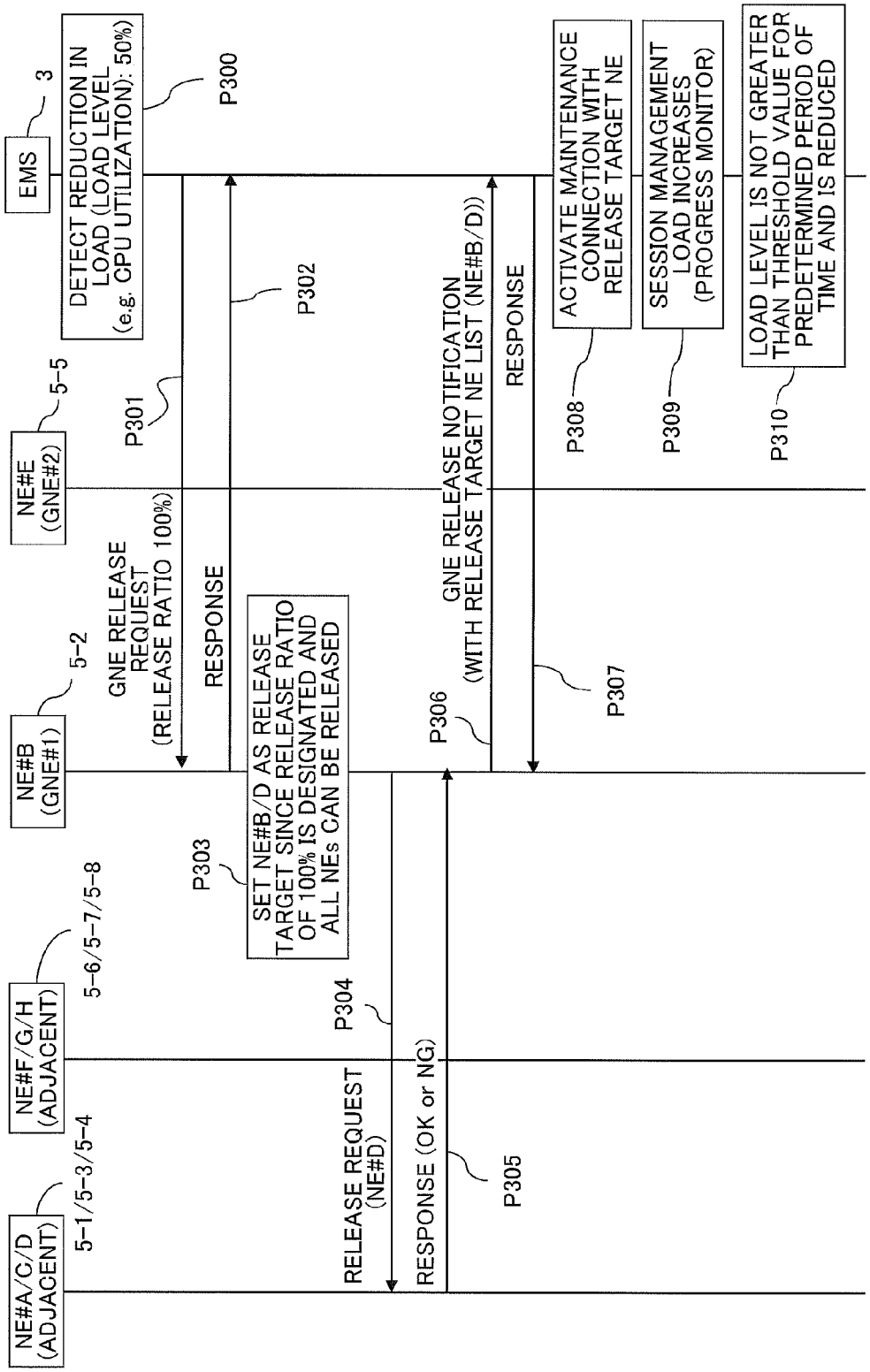
Figure 19:
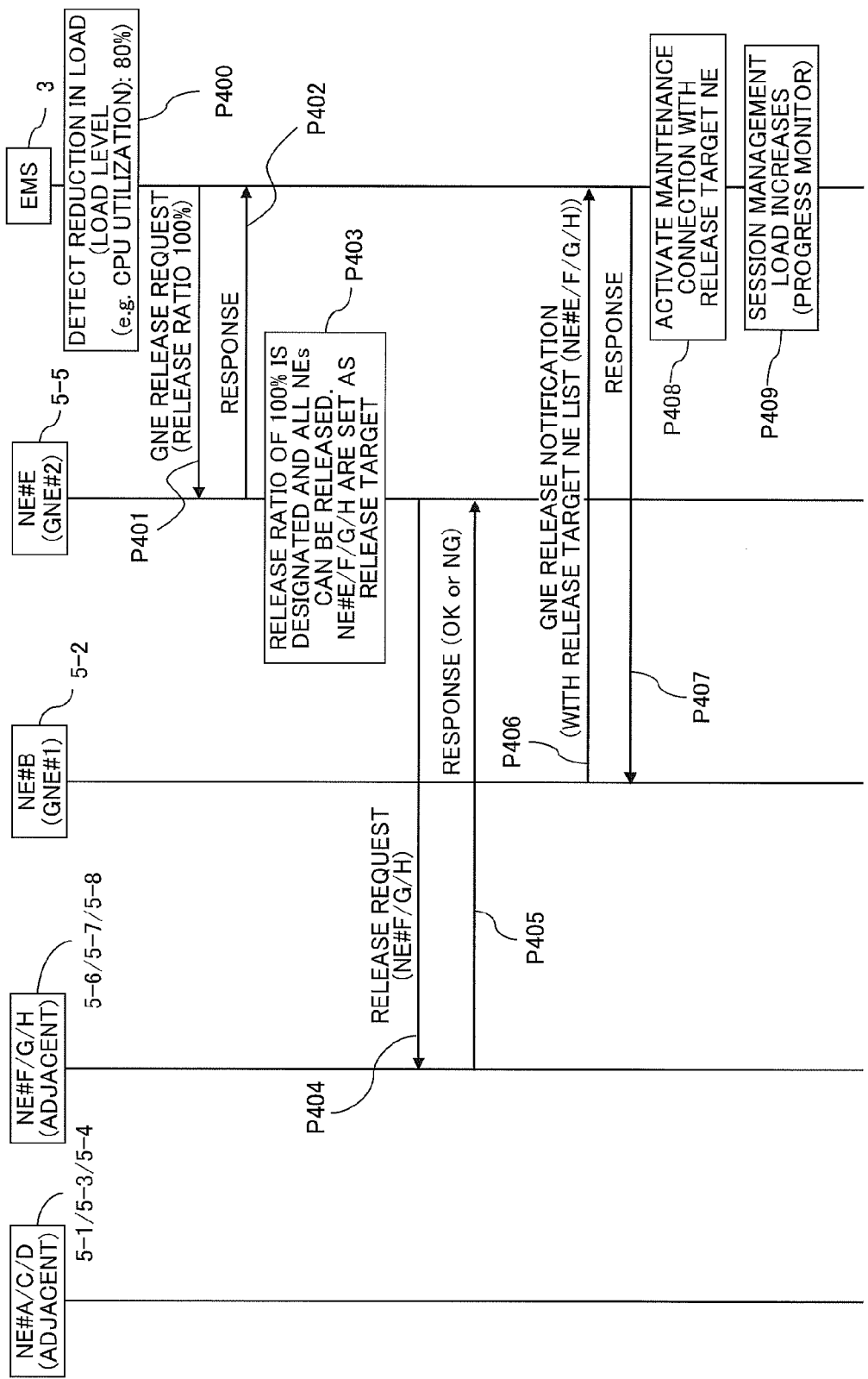

FIGS. 17 to 19 illustrate an example of a GNE stepwise release process sequence when the load of the EMS 3 is reduced. FIGS. 17 to 19 illustrate an example in which a stepwise reduction in the load level of the EMS 3 is detected two times.

For example, as illustrated in FIG. 17, when the load level of the EMS 3 (for example, the CPU utilization) is 30%, a reduction in the load of the EMS 3 is detected (Process P200). Upon detecting the reduction in the load, the EMS 3 transmits a GNE release request designating, for example, a release ratio of 50% to the GNE#1 (NE#B) in the NE group #1 (Process P201).

Upon receiving the GNE release request, the GNE#1 (NE#B) returns a response to the EMS 3 (Process P202) and calculates the number of NEs 5 to be released according to the release ratio of 50%. In the example illustrated in FIG. 17, since the four NEs, that is, the NE#A to NE#D belong to the NE group #1, the GNE#1 determines a half of the four NEs, that is, two NEs 5 (for example, NE#A and NE#C) as release targets (Process P203). The response to the GNE release request may be transmitted after the number of NEs 5 to be released is determined.

The GNE#1 transmits a release request to each of the NE#A and NE#C which are determined as the release targets (Process P204). Upon receiving the release request, the NE#A and NE#C each return a response (OK or NG) to the received release request to the GNE#1 (Process P205). The response indicative of the NG may be, for example, transmitted in a case where the NE 5 having received the release request has already been selected as the GNE 5.

Upon receiving the response from the release targets of the NE#A and NE#C, the GNE#1 transmits to the EMS 3 a GNE release notification including, for example, a list (NE list) of NEs 5 which have returned the OK as the response (Process P206).

Upon receiving the GNE release notification from the GNE#1, the EMS 3 returns a response to the GNE#1 (Process P207) and activates a maintenance connection with each of the release targets of the NE#A and NE#C, based on the NE list included in the GNE release notification (Process P208). The response to the received GNE release notification may be transmitted after the maintenance connection is activated.

Thereby, the EMS 3 is available to perform direct maintenance communication with the NE#A and NE#C, and the load of the session management in the EMS 3 increases. The EMS 3 monitors a change in the load level thereof (progress monitor) (Process P209). When the load level is greater than the threshold value, the EMS 3 may perform the GNE activation process again, as illustrated in FIGS. 3 and 5.

When the load level is not greater than the threshold value for a predetermined period in the progress monitor and a further reduction in the load level is detected (Process P210), the EMS 3 performs a release process sequence illustrated in FIG. 18.

For example, it is assumed that, as described above, the maintenance connections with the two NEs, that is, the NE#A and NE#C belonging to the NE group #1 are activated and the activation result causes to increase the load level of the EMS 3 in temporarily greater than 50% but the load level is then reduced to 50%.

Upon detecting that the load level is reduced to 50% (Process P300), the EMS 3 transmits a GNE release request designating, for example, a release ratio of 100% to the GNE#1 (NE#B) in the NE group #1 (Process P301).

Upon receiving the GNE release request, the GNE#1 (NE#B) returns a response to the EMS 3 (Process P302) and calculates the number of NEs 5 to be released according to the designated release ratio of 100%. In the example illustrated in FIG. 18, the GNE#1 determines the rest of the two NEs 5 in the NE group #1, that is, the NE#B and NE#D as release targets, which have not released in the process sequence illustrated in FIG. 17 (Process P303). The response to the GNE release request may be transmitted after the release target NEs 5 are determined.

The GNE#1 transmits a release request to the NE#D other than the GNE#1 (NE#B) determined as the release target (Process P304). Upon receiving the release request, the NE#D returns a response (OK or NG) to the received release request to the GNE#1 (Process P305). The response of the NG may be, for example, transmitted in a case where the NE 5 having received the release request has already been selected as the GNE 5.

Upon receiving the response from the release target NE#D, the GNE#1 transmits a GNE release notification including, for example, a list (NE list) of the NEs 5 which have returned the OK in the response to the EMS 3 (Process P306). In this example, since the GNE#1 (NE#B) is also the release target, the NE#B and NE#D are included in the NE list.

Upon receiving the GNE release notification from the GNE#1, the EMS 3 transmits a response to the GNE#1 (Process P307) and activates maintenance connections with the release target NE#B and NE#D, based on the NE list included in the GNE release notification (Process P308). The response to the received GNE release notification may be transmitted after the maintenance connections are activated.

Thereby, the EMS 3 is available to perform direct maintenance communication with the NE#B and NE#D, and the load of the session management in the EMS 3 increases. The EMS 3 monitors a change in the load level thereof (progress monitor) (Process P309). When the load level is greater than the threshold value, the EMS 3 may perform the GNE activation process again, as illustrated in FIGS. 3 and 5.

When the load level is not greater than the threshold value for a predetermined period in the progress monitor and a further reduction in the load level is detected (Process P310), the EMS 3 performs a release process sequence illustrated in FIG. 19.

For example, it is assumed that, as described above, the maintenance connections with all of the NEs 5 in the NE group #1, that is, the NE#A to NE#D belonging to the NE group #1 are activated and the activation result causes to increase the load level of the EMS 3 in temporarily greater than 80% but the load level is then reduced to 80%.

Upon detecting that the load level is reduced to 80% (Process P400), the EMS 3 transmits a GNE release request designating, for example, a release ratio of 100% to the GNE#2 (NE#E) in the NE group #2 (Process P401).

Upon receiving the GNE release request, the GNE#2 (NE#E) returns a response to the EMS 3 (Process P402) and calculates the number of NEs 5 to be released according to the designated release ratio of 100%. In the example illustrated in FIG. 19, the GNE#2 determines all of the NEs 5 in the NE group #2, that is, the NE#E to NE#H belonging to the NE group #2 as release targets (Process P403). The response to the GNE release request may be transmitted after the release target NEs 5 are calculated and determined.

The GNE#2 transmits a release request to the NE#F to NE#H other than the GNE#2 (NE#E), which are determined as the release targets (Process P404). Upon receiving the release request, the NE#F to NE#H each return a response (OK or NG) to the received release request to the GNE#2 (Process P405). The response of the NG may be, for example, transmitted in a case where the NE 5 having received the release request has already been selected as the GNE 5.

Upon receiving the response from each of the NE#F to NE#H to be released, the GNE#2 transmits to the EMS 3 a GNE release notification including a list (NE list) of NEs 5 which have returned the OK as the response (Process P406). In this example, since the GNE#2 (NE#E) is also the release target, the NE list includes the NE#E to NE#H.

Upon receiving the GNE release notification from the GNE#2, the EMS 3 transmits a response to the GNE#2 (Process P407) and activates maintenance connections with the NE#E and the NE#H to be released, based on the NE list included in the GNE release notification (Process P408). The response to the received GNE release notification may be transmitted after the maintenance connections are activated.

Thereby, the EMS 3 is available to perform direct maintenance communication with the NE#E to NE#H, and the load of the session management in the EMS 3 increases. The EMS 3 monitors a change in the load level thereof (progress monitor) (Process P409). When the load level is greater than the threshold value, the EMS 3 may perform the GNE activation process again, as illustrated in FIGS. 3 and 5.

The network topology after the process illustrated in FIGS. 16 to 19 is completed corresponds to the network topology illustrated in FIG. 2. In the process sequence illustrated in FIG. 16, since all of the NEs 5 in the NE group #1 are released, the network topology returns to the network topology illustrated in FIG. 2.

Figure 20:
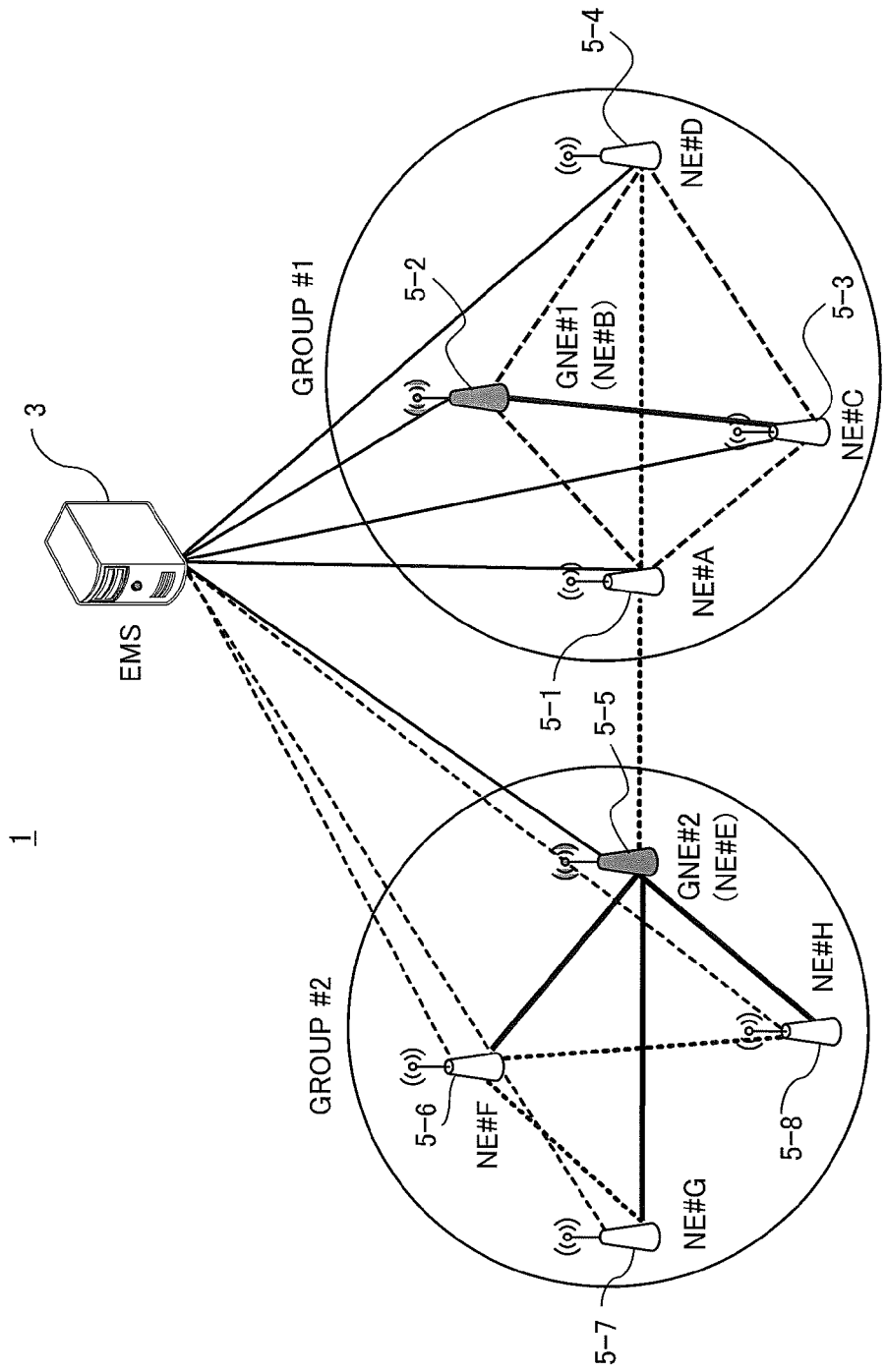
FIG. 20 is a diagram illustrating an example of the network topology after the first cancellation (or deactivation) process illustrated in FIG. 17.

Meanwhile, in the process sequence illustrated in FIG. 17, when a reduction in the load level is detected first, the network topology illustrated in FIG. 8 is changed to the network topology illustrated in FIG. 20. Thereafter, when the load level is not greater than the threshold value for a predetermined period in the progress monitor and a further reduction in the load level is detected, the second release (all release) process illustrated in FIG. 18 is performed and the NE group #1 returns to the network topology illustrated in FIG. 2.

As such, the EMS 3 stores the release ratios corresponding to some stepwise threshold values of the reduced load level and determines a limited number of the NEs 5 as the release target(s) at the load level which possibly causes the risk of an increase in the load greater than the threshold value. Therefore, it is possible to minimize the risk of the increase in the load greater than the threshold value.

When the NEs 5 are released at once rather than performing the stepwise release process, the load level of the EMS 3 increases rapidly and easily exceed the threshold value. As a result, an unnecessary process of repeating the GNE activation process may be caused. Therefore, the stepwise release process is effective at the time when the load of the EMS 3 is reduced.

The EMS 3 may store the stepwise load levels (for example, the CPU utilization: 50%/20%) and the number of NEs 5 to be released which corresponds to each load level (for example, 50%/100% of the number of all of the NEs 5 under managed) as processing conditions (policy) in advance. In this case, when the load is reduced and the load level is less than the threshold value, it is available to perform the release process in the range of the number of corresponding NEs to be released to return the released NEs 5 to the dependents of the EMS 3.

(Example of Structure of EMS and GNE (NE))

Next, an example of the structure of the EMS 3 and the GNE (NE) 5 to implement the functions according to each of the above-mentioned embodiments will be described.

(Example of Structure of EMS)

Figure 21:
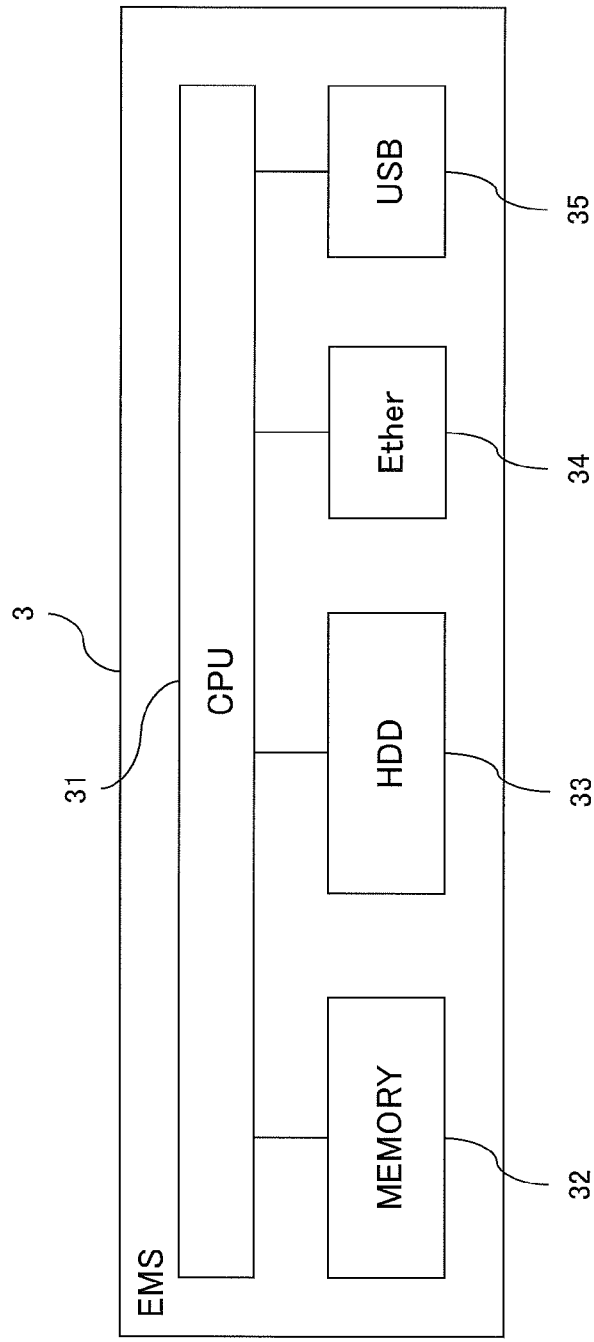
FIG. 21 is a block diagram illustrating an example of the hardware configuration of the EMS.
Figure 22:
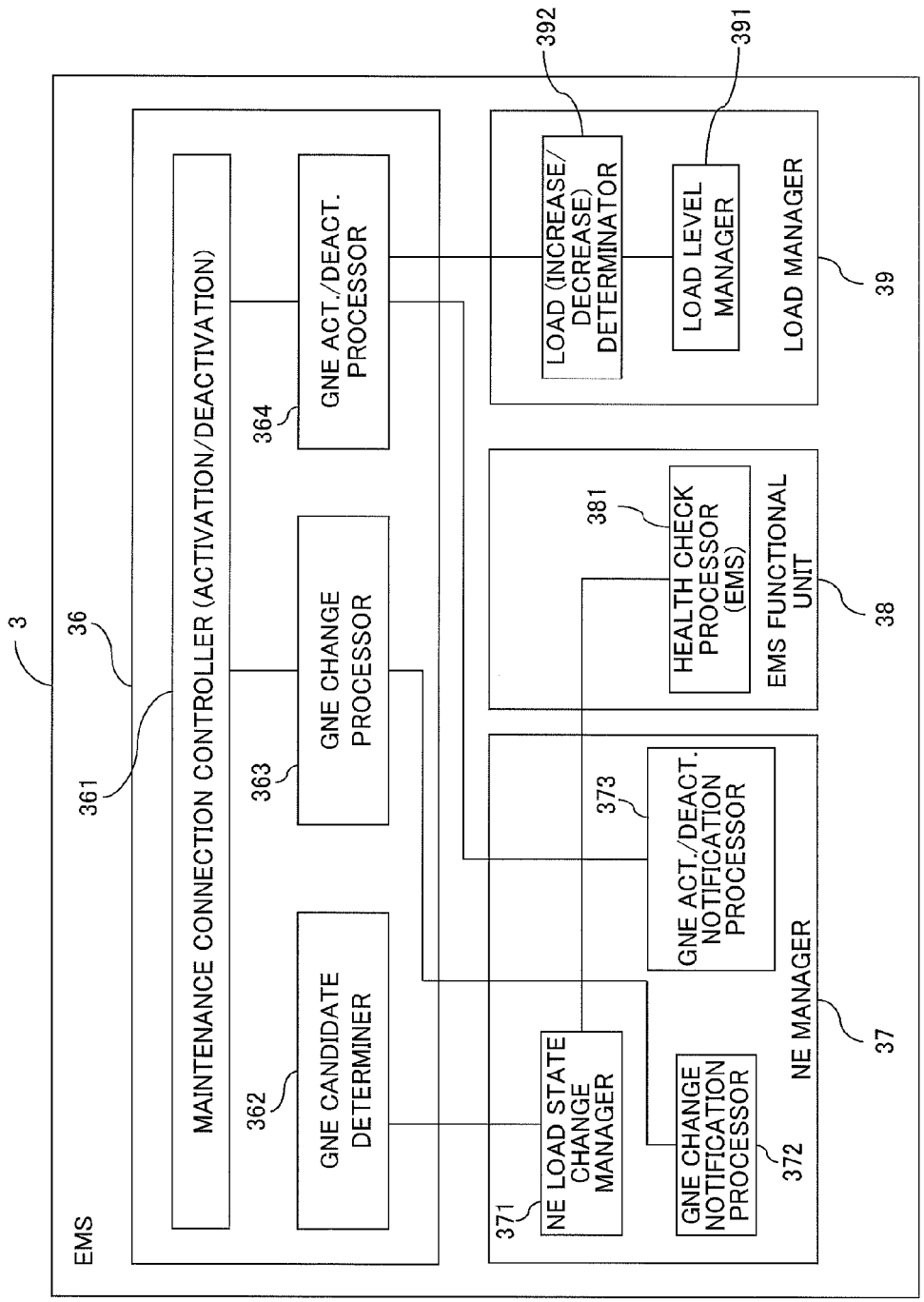
FIG. 22 is a block diagram illustrating an example of the software configuration of the EMS.

FIG. 21 is a block diagram illustrating an example of a hardware configuration of the EMS 3 and FIG. 22 is a block diagram illustrating an example of a software configuration of the EMS 3.

The EMS 3 can be implemented by a computer such as a server computer. As illustrated in FIG. 21, upon focusing on the hardware configuration, the EMS 3 includes, for example, a CPU 31, a memory 32, a hard disk drive (HDD) 33, an Ethernet interface 34, and a USB interface 35. The "Ethernet" is a registered trademark.

The CPU 31 is an example of an arithmetic processing device with computing capability. The CPU 31 reads, for example, a program (or software) or data stored in the memory 32 or the HDD 33 and executes the read program or data to control the whole operation of the EMS 3.

The program or data may include, for example, a program (or program codes) used by the EMS 3 to implement the OAM function described in each of the above-described embodiments or data used for the OAM function. The data may include, for example, the EMS management table 300 illustrated in FIG. 7, the threshold value of the load level of the EMS 3, and the release ratio corresponding to the load level.

The CPU 31 reads the program or data and executes the read program or data to implement the OAM function of the EMS 3 according to each of the above-described embodiments. FIG. 22 illustrates an example of a software configuration focusing on the implemented OAM function as such.

The memory 32 and the HDD 33 are examples of a storage unit and store the program or data used by the EMS 3 to implement the OAM function. The memory 32 serves as, for example, a work memory of the CPU 31. The CPU 31 is operable to expand the program or data stored in the HDD 33 to the memory 32 and to use the expanded program or data.

The Ethernet interface 34 is an example of a transmission line interface corresponding to a wired transmission line which enables mutual communication (which may be referred to as maintenance communication) with the NE 5 as illustrated in FIG. 1. The EMS 3 (CPU 31) is operable to activate or deactivate the maintenance connection with the NE 5 through the Ethernet interface 34.

The USB interface 35 is an example of a recording medium interface that enables a USB memory which is an example of a recording medium to be connected to the EMS 3. The CPU 31 is operable to read out a program or data stored in the USB memory connected to the USB interface 35 from the USB memory and to store the read program or data in, for example, the HDD 33. Therefore, it is possible to install the program to implement the OAM function in the EMS 3. The program to implement the OAM function may be installed (or download) to the EMS 3 through a communication line such as the Internet.

Then, as illustrated in FIG. 22, upon focusing on the software configuration, the EMS 3 includes, for example, a GNE manager 36, an NE manager 37, an EMS functional unit 38, and a load manager 39.

The GNE manager 36 is operable to perform, for example, a process of controlling (activating and deactivating) the maintenance connection with the NE 5, a process of determining (or selecting) the GNE candidate, a GNE change process, and a GNE activation and deactivation process. Therefore, the GNE manager 36 includes, for example, a maintenance connection controller 361, a GNE candidate determinator 362, a GNE change processor 363, and a GNE activation/deactivation processor 364.

The maintenance connection controller 361 is operable to control the setting (activation and inactivation) of the maintenance connection with the NE 5 according to the activation, change, and deactivation of the GNE 5. For example, as described above, the maintenance connection controller 361 is operable to deactivate the maintenance connection with the NE 5 dependent to the GNE 5 or to activate the maintenance connection with the NE 5 returned to the dependent of the EMS 3 by the GNE release process.

The GNE candidate determinator 362 is operable to operate in cooperation with, for example, the NE manager 37 to determine the NE 5 which is the GNE candidate based on the load information of each NE 5, as described above. The load information of each NE is managed by, for example, an NE load state change manager 371 described below.

The GNE change processor 363 is operable to perform, when a GNE change notification is received from the GNE 5 in response to the GNE function transfer process (for example, see FIG. 14), a process of changing the GNE 5 to a GNE 5 which is notified by the GNE change notification. The GNE change notification is received by, for example, a GNE change notification processor 372 of the NE manager 37 and is then transmitted to the GNE change processor 363.

The process of changing the GNE 5 may include a process of notifying the maintenance connection controller 361 of information to identify the pre-changed and post-changed GNEs 5. Therefore, the maintenance connection controller 361 is operable to deactivate the maintenance connection with the pre-changed GNE 5 and to activate the maintenance connection with the post-changed GNE 5.

The GNE activation/deactivation processor 364 is operable to perform a process of activating and deactivating the GNE 5 in cooperation with the NE manager 37 and the load manager 39. For example, when the load level of the EMS 3 is greater than a predetermined threshold level, the GNE activation/deactivation processor 364 is operable to instruct the GNE activation/deactivation notification processor 373 of the NE manager 37 to transmit a GNE activation request. When the load level of the EMS 3 is equal to or less than the predetermined threshold level, the GNE activation/deactivation processor 364 is operable to instruct the GNE activation/deactivation notification processor 373 of the NE manager 37 to transmit a GNE release request.

Further, the GNE activation/deactivation processor 364 is operable to notify, when the GNE activation notification is received from the GNE 5 through the GNE activation/deactivation notification processor 373, the maintenance connection controller 361 of the list of the NEs dependent to the GNE 5 included in the notification. When the GNE release notification is received from the GNE 5, the GNE activation/deactivation processor 364 is operable to notify the maintenance connection controller 361 of the list of the NEs 5 to be released, which is included in the notification.

The maintenance connection controller 361 operable to deactivate or activate maintenance connection with the NE 5 included in the NE list notified by the GNE activation/deactivation processor 364. Thereby, it is possible to control the maintenance connection with the NE 5 in response to the activation or deactivation of the GNE 5.

The NE manager 37 is operable to manage the load state of the NE 5 in cooperation with, for example, a health check processor 381 of the EMS functional unit 38 and to perform a process of receiving the GNE activation notification and the GNE change notification and a process of transmitting the GNE candidate notification, the GNE activation request, and the GNE release request.

Therefore, the NE manager 37 includes, for example, an NE load state change manager 371, a GNE change notification processor 372, and a GNE activation/deactivation notification processor 373.

The NE load state change manager 371 is operable to collect the load information of each NE, which is acquired in the health check sequence performed by the health check processor 381, to manage the load information, and to manage the load state of each NE 5 and a change in the load state. Based on the load information managed by the NE load state change manager 371, the GNE candidate determinator 362 is operable to determine the GNE candidates.

The GNE change notification processor 372 is operable to receive, when the GNE 5 is changed (transferred), the GNE change notification transmitted from the GNE before the change and to transmit the GNE change notification to the GNE change processor 363, for example.

The GNE activation/deactivation notification processor 373 is operable to perform, for example, a process of receiving the GNE activation notification transmitted from the GNE 5 and a process of transmitting the GNE candidate notification to the NE 5 determined as the GNE candidate, transmitting the GNE activation request to the NE 5, and transmitting the GNE release request to the GNE 5.

The EMS functional unit 38 includes, for example, the health check processor 381 which is operable to perform a health check process on the NE 5 dependent to the EMS 3. As described above, the health check processor 381 is operable to perform the health check sequence on the NE 5.

The load manager 39 is operable to manage the load of the EMS 3. Therefore, the load manager 39 includes, for example, a load level manager 391 and a load determinator 392.

The load level manager 391 is operable to monitor and manage the load level such as the utilization of the CPU 31, as an example of the load information of the EMS 3.

The load determinator 392 is operable to compare the load level monitored and managed by the load level manager 391 with a predetermined threshold level to determine whether the load of the EMS 3 is greater than the threshold level or less than the threshold level. The determination result may be used as a trigger for the activation or deactivation process of the GNE 5 by the GNE activation/deactivation processor 364.

(Example of Structure of GNE (NE))

Figure 23:
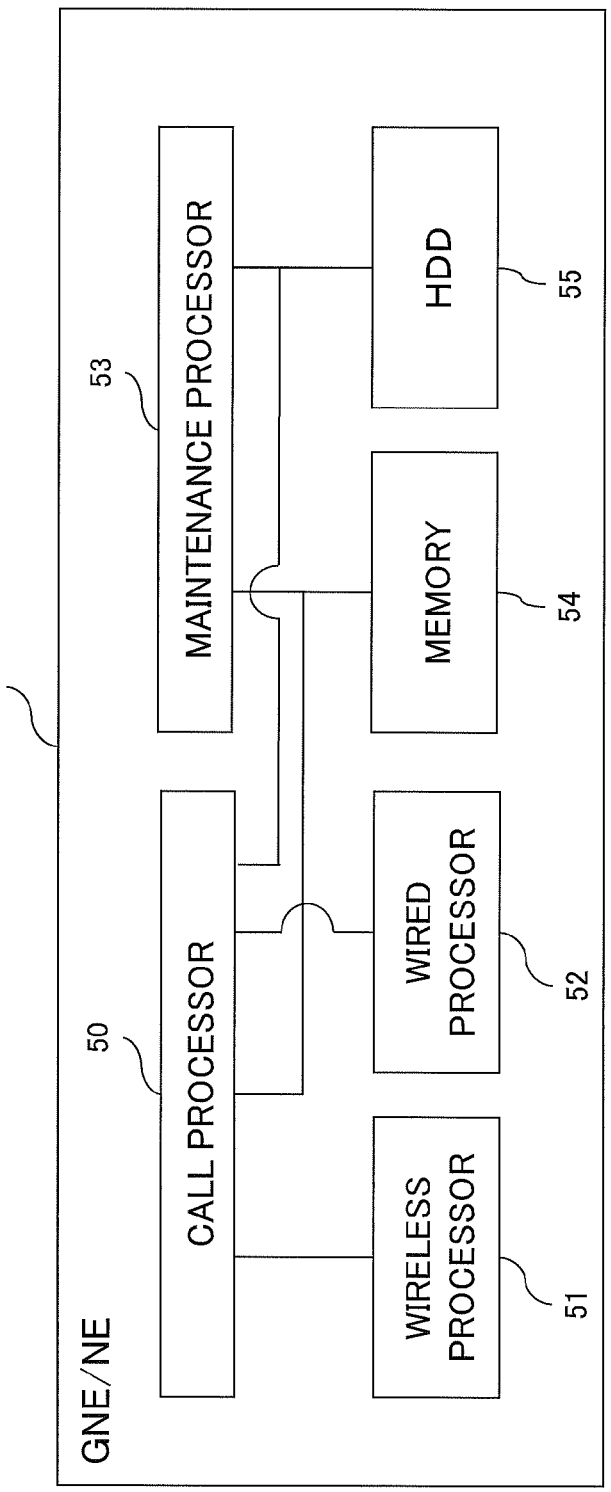
FIG. 23 is a block diagram illustrating an example of the hardware configuration of the NE and the GNE.
Figure 24:
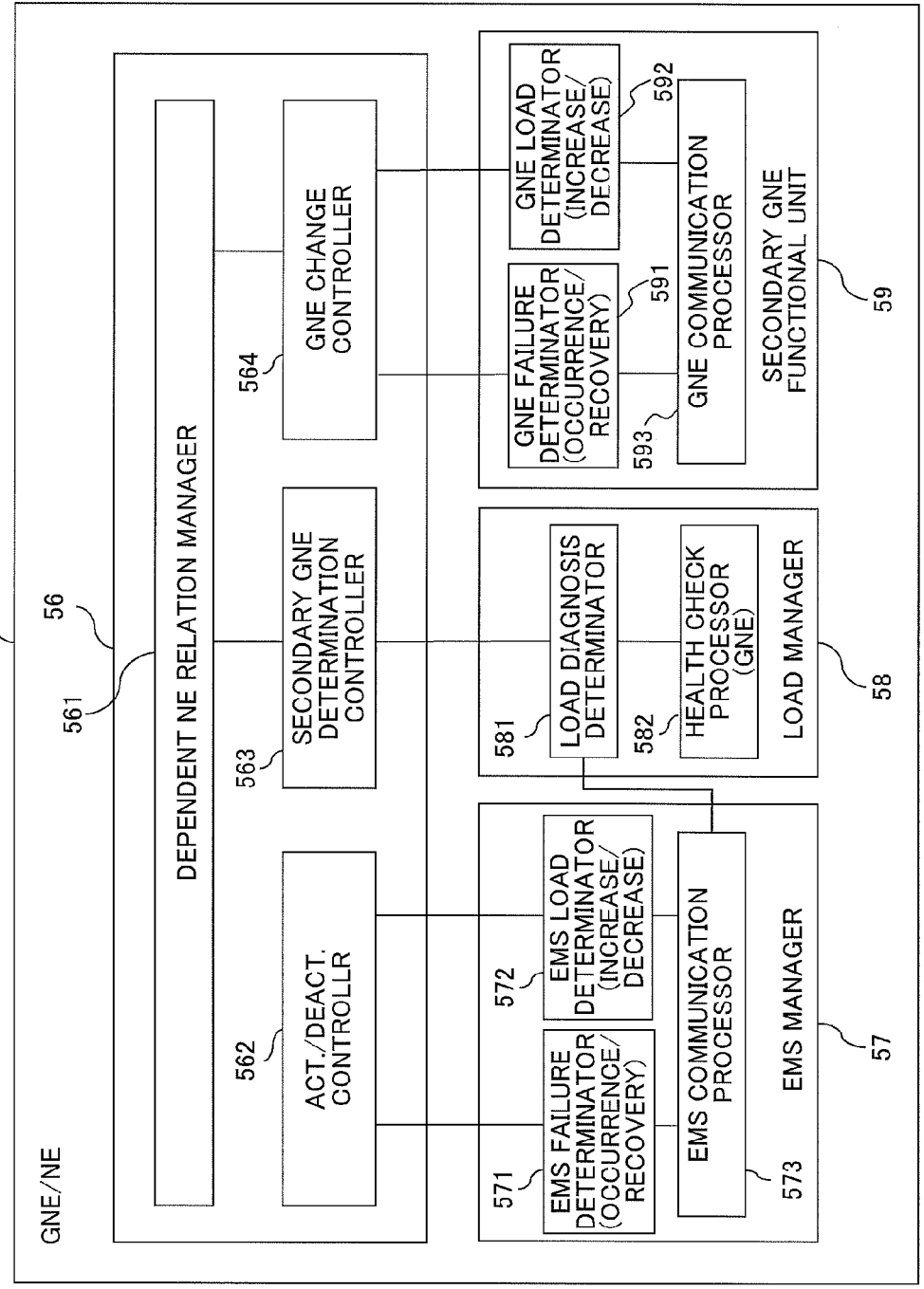
FIG. 24 is a block diagram illustrating an example of the software configuration of the NE and the GNE.
Figure 25:
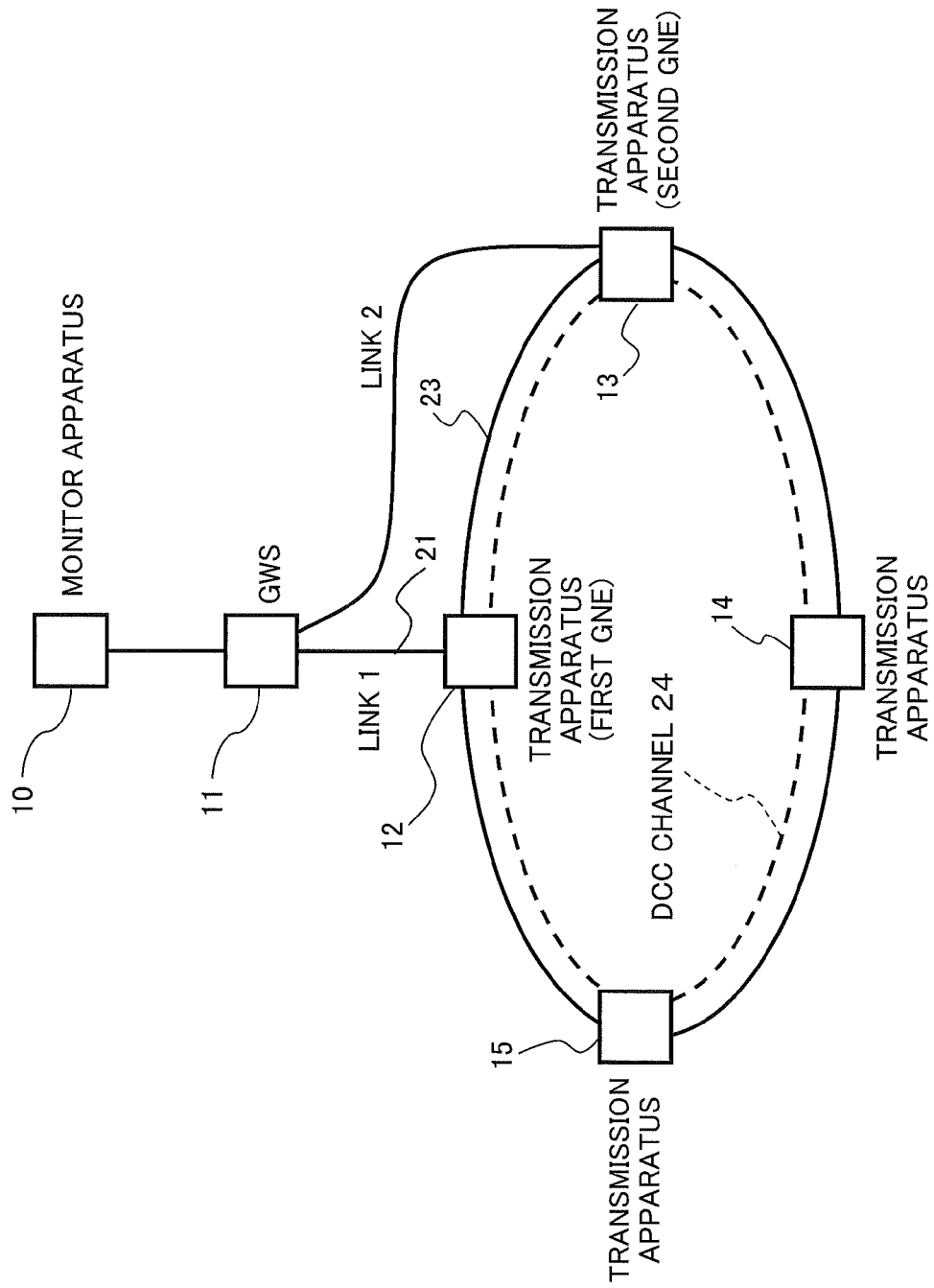
FIG. 25 is a diagram illustrating a network monitoring control system according to the prior art.

FIG. 23 is a block diagram illustrating an example of a hardware configuration of the GNE (NE) 5 and FIG. 24 is a block diagram illustrating an example of a software configuration of the GNE (NE) 5.

As illustrated in FIG. 23, focusing on the hardware configuration, the NE 5 includes, for example, a call processor 50, a wireless processor 51, a wired processor 52, a maintenance processor 53, a memory 54, and an HDD 55.

The call processor 50 is an example of an arithmetic processing device with computing capability and is operable to control (for example, call control) wireless communication through the wireless processor 51 and wired communication through the wired processor 52. A program (or software) or data used for the call control may be stored in, for example, the memory 54 or the HDD 55. The call processor 50 is operable to appropriately read the program or data from the memory 54 or the HDD 55 and to execute the program or data to perform the call control.

The wireless processor 51 is operable to process radio signals transceived with a wireless terminal under the control of the call processor 50, for example.

The wired processor 52 is operable to process signals transceived with the EMS 3 or another NE 5 by wired communication under the control of the call processor 50, for example. The wired communication includes, for example, communication through the X2 interface or an RNSAP interface.

The maintenance processor 53 is an example of an arithmetic processing device with computing capability similarly to the call processor 50 and is operable to appropriately read the program or data stored in the memory 54 or the HDD 55 and to execute the read program or data to implement the GNE function described in each of the above-described embodiments. The data includes, for example, the management table 500 illustrated in FIG. 10 or the threshold value of the load level of the GNE 5. FIG. 24 illustrates an example of the software configuration which is focused on the implemented GNE function.

The program and data to implement the GNE function may be installed in, for example, the HDD 55 from a recording medium such as a USB memory, or may be installed in the HDD 55 through a communication line such as the Internet, similarly to the case of the EMS 3.

The memory 54 and the HDD 55 are examples of the storage unit of the NE 5, and is operable to store the program or data used by the call processor 50 to perform the call control, and to store the program or data used by the maintenance processor 53 to implement the GNE function, as described above. The memory 54 is operable to serve as, for example, a work memory for each of the processors 50 and 53. Each of the processors 50 and 53 is operable to expand the program or data stored in the HDD 55 to the memory 54 and to use the expanded program or data.

Next, as illustrated in FIG. 24, focusing on the software configuration, the NE 5 includes, for example, a GNE functional unit 56, an EMS manager 57, a load manager 58, and a secondary GNE functional unit 59.

The GNE functional unit 56 is operable to manage, upon receiving the GNE candidate notification from the EMS 3, the dependent relation of the NEs 5 dependent to the NE 5 and to perform a process of activating and deactivating the GNE function, a process of controlling the determination of the secondary GNE 5, and a process of controlling the change of the GNE to the secondary GNE 5, for example.

The GNE functional unit 56 is an example of a controller that controls the setting of the maintenance connection based on the monitor result of the EMS manager 57 (or the secondary GNE functional unit 59) serving as an example of a monitor. For example, the controller is operable to control the setting of the maintenance connection between the self-NE 5 equipped with the controller and the dependent NE 5 and the setting of the maintenance connection between the EMS 3 and the dependent NE 5.

Therefore, the GNE functional unit 56 includes, for example, a dependent NE relation manager 561, an activation/deactivation controller 562, a secondary GNE determination controller 563, and a GNE change controller 564.

The dependent NE relation manager 561 is operable to manage, for example, the dependent relation of NEs 5 dependent to the self-NE 5. For example, in the case of the GNE#1 in the NE group #1 illustrated in FIG. 6, the dependent NE relation manager 561 is operable to manage the dependent relation of the NE#A, NE#B, and NE#D dependent to the GNE#1. In the case of the GNE#2 in the NE group #2 illustrated in FIG. 6, the dependent NE relation manager 561 is operable to manage the dependent relation of the NE#F, NE#G, and NE#H dependent to the GNE#2.

The activation/deactivation controller 562 is operable to control the activation and deactivation of the GNE function in cooperation with the EMS manager 57. For example, the activation/deactivation controller 562 is operable to perform the GNE activation process described with reference to FIGS. 3 to 5 and the GNE release process described with reference to FIGS. 16 to 19.

The secondary GNE determination controller 563 is operable to controls, for example, the determination of the secondary GNE candidate as illustrated in FIGS. 5 and 11 and to control communication (for example, including the health check sequence) with the determined secondary GNE candidate, in cooperation with the load manager 58.

The GNE change controller 564 is operable to control, for example, the process of changing the GNE from the primary GNE 5 to the secondary GNE 5 as described with reference to FIGS. 12 to 14, in cooperation with the secondary GNE functional unit 59.

The EMS manager 57 is operable to monitor communication with the EMS to monitor the state of the EMS 3 (for example, an increase and decrease in load and the occurrence and recovery of a failure). Therefore, the EMS manager 57 includes, for example, an EMS failure determinator 571, an EMS load determinator 572, and an EMS communication processor 573 with a health check monitoring function.

The EMS failure determinator 571 is operable to determine, when the EMS communication processor 573 detects a failure of receiving the health check signal in a predetermined period from the EMS 3, an occurrence in the EMS 3. The determination result is notified to the activation/deactivation controller 562 of the GNE functional unit 56. Thereby, the activation/deactivation controller 562 is operable to perform the GNE activation process in response to the notification.

Further, the EMS failure determinator 571 is operable to determine, when the EMS communication processor 573 detects the reception of the health check signal from the EMS 3 after the EMS failure determinator 571 detects the occurrence the EMS 3, a recovery of the failure in the EMS 3. The determination result is notified to the activation/deactivation controller 562 of the GNE functional unit 56. Thereby, the activation/deactivation controller 562 is operable to perform the GNE release process in response to the notification.

The EMS communication processor 573 is operable to process communication with the EMS 3. The process may include the processing of the signals transceived in the health check sequence. For example, the EMS communication processor 573 is operable to monitor whether the health check signal is received in a predetermined period from the EMS 3 and to notify the EMS failure determinator 571 of the monitoring (or detection) result.

The EMS communication processor 573 is an example of a transmission unit operable to transmit the load information of the self-NE 5 to the EMS 3. For example, the EMS communication processor 573 is operable to include load information of the self-NE 5 in a response signal for the health check signal. Further, the EMS communication processor 573 is operable to transmit the magic packet to the EMS 3.

Furthermore, the EMS communication processor 573 is operable to monitor whether the GNE candidate notification, the GNE activation request, or the GNE release request is received from the EMS 3. Therefore, the EMS communication processor 573 is also an example of a receiver operable to receive signals transmitted from the EMS 3. Upon receiving the notification or the request, the EMS communication processor 573 is operable to notify the EMS load determinator 572 of the reception of the notification or the request.

The EMS load determinator 572 is operable to determine, when a notification indicating the reception of the GNE activation request is received from the EMS communication processor 573, that the load of the EMS 3 exceeds a predetermined threshold value and to notify the determination result to the activation/deactivation controller 562 of the GNE functional unit 56. Thereby, the activation/deactivation controller 562 is operable to perform the GNE activation process.

Further, the EMS load determinator 572 is operable to determine, when a notification indicating the reception of the GNE activation request is received from the EMS communication processor 573, that the load of the EMS 3 falls below the predetermined threshold value and to notify the determination result to the activation/deactivation controller 562 of the GNE functional unit 56. Thereby, the activation/deactivation controller 562 is operable to perform the GNE release process.

When the release ratio is designated in the GNE release request, for example, the release ratio is notified from the EMS communication processor 573 to the activation/deactivation controller 562 through the EMS load determinator 572. Upon receiving the notification, the activation/deactivation controller 562 is operable to perform the stepwise release process according to the release ratio, as described with reference to, for example, FIGS. 17 to 19.

The load manager 58 is operable to monitor the load state of the dependent NEs 5 including the secondary GNE 5, for example. Therefore, the load manager 58 includes, for example, a load diagnosis determinator 581 and a health check processor 582.

As illustrated in FIG. 11, the health check processor 582 is operable to perform the health check sequence on the dependent NEs 5 including the secondary GNE 5 and to notify the load diagnosis determinator 581 of load information included in the health check signal and the response signal.

The load diagnosis determinator 581 is operable to diagnose and determine the load state of the secondary GNE 5 based on the load information notified by the health check processor 582. For example, in response to a change in the NE 5 with the lowest load level equal to or less than the threshold value, the load diagnosis determinator 581 is operable to notify the secondary GNE determination controller 563 of the change. Upon receiving the notification, the secondary GNE determination controller 563 is operable to determine the NE 5 with the lowest load level as the secondary GNE (the update of the secondary GNE: see FIG. 11).

The secondary GNE functional unit 59 is an example of a monitor and is operable to monitor communication with the (primary) GNE 5 to monitor the state of the GNE 5 (for example, an increase and decrease in load and the occurrence and recovery of a failure). Therefore, the EMS manager 57 includes, for example, a GNE failure determinator 591, a GNE load determinator 592, and a GNE communication processor 593 with a health check monitoring function.

The GNE failure determinator 591 is operable to determine, when the GNE communication processor 593 detects a failure of receiving the health check signal in a predetermined period from the GNE 5, an occurrence of a failure in the GNE 5. The determination result is notified to the GNE change controller 564 of the GNE functional unit 56. Thereby, the GNE change controller 564 is operable to perform a process of transferring the GNE function (for example, see FIGS. 13 and 14).

The GNE communication processor 593 is operable to process communication with another NE 5 which is selected as the GNE 5. The process may include the processing of the signals transceived in the health check sequence. For example, the GNE communication processor 593 is operable to monitor whether the health check signal is received in a predetermined period from the GNE 5 and to notify the GNE failure determinator 591 of the monitoring (or detection) result. Further, the GNE communication processor 593 is operable to monitor whether a GNE transfer request is received from the GNE 5. The GNE communication processor 593 is operable to notify, in response to a reception of the GNE transfer request, the GNE load determinator 592 of the reception of the GNE transfer request.

The GNE load determinator 592 is operable to determine, when the reception of the GNE transfer request is notified by the GNE communication processor 593, that the load of the GNE 5 exceeds the predetermined threshold value and to notify the determination result to the GNE change controller 564 of the GNE functional unit 56. Thereby, the GNE change controller 564 is operable to perform the process of changing the GNE to the secondary GNE (for example, see FIGS. 12 and 14).

The secondary GNE 5 may be dependent to (may return to the dependent of) the primary GNE 5 when the load of the primary GNE 5 is reduced or when the failure is recovered. The GNE change controller 564 and the secondary GNE functional unit 59 are operable to perform, in cooperation with each other, a negotiation with the secondary GNE 5 to perform the return process.

For example, the GNE failure determinator 591 of the secondary GNE 5 is operable to determine, when the GNE communication processor 593 detects an reception of a resumed health check signal from the GNE 5 after a detection of a failure in the primary GNE 5, the recovery of the failure in the GNE 5. Further, the GNE load determinator 592 of the secondary GNE 5 is operable to determine, when the reception of the GNE return request is notified by the GNE communication processor 593, that the load of the primary GNE 5 falls below a predetermined threshold value.

The determination results may be notified to the GNE change controller 564 of the GNE functional unit 56. The GNE change controller 564 is operable to negotiate with the primary GNE 5 about returning the secondary GNE 5 to the dependent of the primary GNE 5 as the dependent NE, based on the notified determination results.

As described above, according to each of the above-described embodiments, it is possible to autonomously optimize network management, without the intervention of the maintainer, and to achieve a flexible and high-reliability network management. For example, the GNE 5 which monitors the state of the EMS 3 is operable to control, based on the monitor result, the setting of a maintenance connection with another NE 5 which is operable to communicate with the GNE 5 through the inter-NE interface. Thereby, it is possible to autonomously form (or configure) a management group including the GNE 5 and the NE 5 which is dependent to the GNE 5. Accordingly, it is possible to detect the abnormal state of the EMS 3 or to set or activate the GNE 5 by using a control of the software installed in the EMS 3 and the NE 5, without the intervention of the maintainer.

The GNE function of the NE 5 serves as not only a monitor function to monitor the NE 5 on the behalf of the EMS 3 but also a gateway function for maintenance communication with the EMS 3. Therefore, even when an abnormality occurs in the EMS 3, the GNE 5 is available to continuously perform the OAM on the NE 5. Accordingly, the minimal OAM which allows the NE(s) 5 to maintain (or guarantee) a continuous service.

Further, the EMS 3 is operable to release the maintenance connection with the NE 5 dependent to the GNE 5 upon receiving a control signal which is a request to release the maintenance connection with the NE 5 and includes a list of the NEs 5 dependent to the GNE 5. Therefore, the number of NEs 5 to be monitored by the EMS 3 is reduced, and it is possible to reduce the load of the session management for the maintenance communication in the EMS 3.

In the above-mentioned example, the EMS 3 periodically collects the load information of the NE(s) 5 to be monitored and adaptively changes the NE 5 to be selected as the GNE candidate in response to a change in the load of each NE 5. However, the GNE candidate may be predetermined. For example, the GNE candidate may be set in advance to an NE 5 having a processing capability higher than that of the other NEs 5 and having a steady load level in a predetermined level range.

According to the above-mentioned technology, it is possible to autonomously optimize network management without the intervention of the maintainer, and to achieve flexible and high-reliability network management.

All examples and conditional language provided herein are intended for pedagogical purposes to aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. A network element which is selected from a plurality of network elements, the plurality of network elements being used for a network management system that comprises the network elements and a monitor apparatus configured to monitor the network elements,
the network element which serves as a first network element comprising:
a monitor configured to monitor a communication between the first network element and the monitor apparatus to detect an abnormal state of the monitor apparatus; and
a controller configured to control, according to the monitor result of the monitor, a setting of a first connection between the first network element and one or more second network elements communicably connected with the first network element, and a setting of a second connection between the second network element and the monitor apparatus, the first and the second connections being used for maintenance communication in the network management system,
wherein, in response to a detection of the abnormal state of the monitor apparatus in the monitor, the controller sets the first connection, and transmits a control signal including identification information of the second network element, to which the first connection is set, to the monitor apparatus to make the monitor apparatus release the second connection between the second network element and the monitor apparatus.

2. The network element according to claim 1,
wherein the monitor detects an increase in the load of the monitor apparatus as the abnormal state in response to a reception of a signal from the monitor apparatus, the signal indicating that a load of the monitor apparatus is greater than a predetermined threshold value.

3. The network element according to claim 1,
wherein the monitor detects a failure of the monitor apparatus as the abnormal state in response to a detection of a failure of receiving a signal to be periodically received from the monitor apparatus.

4. The network element according to claim 1, further comprising:
a receiver configured to receive, from the monitor apparatus, a notification signal for notifying that the first network element is selected as a network element for detecting the abnormal state of the monitor apparatus,
wherein the monitor monitors communication with the monitor apparatus in response to a reception of the notification signal by the receiver.

5. The network element according to claim 4, further comprising:
a transmitter configured to transmit load information of the first network element to the monitor apparatus,
wherein the selection is performed by the monitor apparatus based on the load information received from the plurality of network elements.

6. The network element according to claim 5,
wherein the transmitter includes the load information into a response signal of the signal which is periodically received from the monitor apparatus.

7. The network element according to claim 1,
wherein the controller performs:
a control of setting any one of the second network elements, to which the first connection is set, as a standby network element that monitors communication with the first network element to monitor the state of the first network element;
a control of releasing the set second connection in response to a reception of a dependent request from the standby network element according to the monitor result in the standby network element; and
a control of making the monitor apparatus activate a second connection between the standby network element and the monitor apparatus.

8. The network element according to claim 1,
wherein the monitor detects a recovery of the abnormal state of the monitor apparatus,
in response to a detection of the recovery, the controller releases the set first connection and transmits a control signal including identification information of the first and second network elements to the monitor apparatus to make the monitor apparatus activate a third connection between the first network element and the monitor apparatus and the second connection, the third connection being used for maintenance communication in the network management system.

9. The network element according to claim 8,
wherein the control of releasing the first connection includes a control of releasing the number of connections corresponding to a release ratio, the release ratio corresponding to the load of the monitor apparatus, in response to a reception of a signal indicating the release ratio.

10. A network element which is selected from a plurality of network elements, the plurality of network elements being used for a network management system that comprises the network elements and a monitor apparatus configured to monitor the network elements,
the network element which serves as a first network element comprising:
a monitor configured to monitor communication with a second network element to detect an abnormal state of the second network element, the second network element setting a first connection with the first network element according to monitoring state of the monitor apparatus; and
a controller configured to control, according to the monitor result of the monitor, a setting of the first connection with one or more of the other network elements including the second network element, the other network elements being communicably connected with the first network element, and a setting of a second connection between the other network elements and the monitor apparatus, the first and the second connections being used for maintenance communication in the network management system, wherein, in response to a detection of the abnormal state of the second network element in the monitor, the controller sets the first connection, and transmits a control signal including identification information of the monitor apparatus, to which the first connection is set, to the second network element to make the second network element release the second connection between the second network element and the monitor apparatus.

11. A network management system comprising:
a plurality of network elements; and
a monitor apparatus configured to monitor the plurality of network elements,
wherein a first network element includes:
a monitor configured to monitor a communication between the first network element and the monitor apparatus to detect an abnormal of the monitor apparatus; and
a controller configured to control, according to the monitor result, a setting of a first connection between the first network element and one or more second network elements communicably connected with the first network element, and a setting of a second connection between the second network element and the monitor apparatus, the first and the second connections being used for maintenance communication in the network management system,
wherein, in response to a detection of the abnormal state of the monitor apparatus in the monitor, the controller sets the first connection, and transmits a control signal including identification information of the second network element, to which the first connection is set, to the monitor apparatus to make the monitor apparatus release the second connection between the second network element and the monitor apparatus.

12. A method of managing a network including a plurality of network elements and a monitor apparatus configured to monitor the plurality of network elements, the method comprising:
monitoring, by a first network element which comprises a monitor, communication with the monitor apparatus to monitor a detect an abnormal state of the monitor apparatus; and controlling, by the first network element according to the monitor result, a setting of a first connection with one or more second network elements communicably connected with the first network element, and a setting of a second connection between the second network element and the monitor apparatus, the first and the second connections being used for maintenance communication in the network management system,
wherein the controlling includes, in response to a detection of the abnormal state of the monitor apparatus in the monitor, setting the first connection, and transmitting a control signal including identification information of the second network element, to which the first connection is set, to the monitor apparatus to make the monitor apparatus release the second connection between the second network element and the monitor apparatus.

13. The method according to claim 12,
wherein each of the network elements transmits load information to the monitor apparatus,
the monitor apparatus selects the first network element based on the load information received from each of the network elements and notifies the first network element of the selection, and
the first network element monitors the communication with the monitor apparatus in response to a reception of the notification of the selection.

14. The method according to claim 12,
wherein the second network element transmits load information of the second network element to the first network element,
the first network element selectively sets any one of the second network elements as a standby network element that monitors communication with the first network element to monitor a state of the first network element,
the standby network element transmits a dependent request to the first network element according to the state monitor result of the first network element,
the first network element releases the first connection with the second network elements including the standby network element in response to a reception of the dependent request from the standby network element, and
the first network element transmits a control signal including identification information of the standby network element to the monitor apparatus to make the monitor apparatus activate the second connection between the standby network element and the monitor apparatus.

15. The method according to claim 14,
wherein the standby network element sets the first connection with one or more of the other network elements including the first network element, the other network elements being communicably connected to the standby network element, and
the standby network element transmits to the monitor apparatus a control signal including identification information of the network elements, to which the first connection is set, to make the monitor apparatus release a third connection between the monitor apparatus and the network elements to which the first connection is set, the third connection being used for maintenance communication in the network management system.

16. The method according to claim 15,
wherein a third network element transmits a request to the monitor apparatus to activate a fourth connection between the third network element and the monitor apparatus, the third network element being unavailable for setting a fifth connection with the monitor apparatus due to the situation that the third network element is communicably connected with the first network element and is not communicably connected with the standby network element, the fourth and fifth connections being used for maintenance communication in the network management system.

17. The method according to claim 12,
wherein the second network element allows, in response to a reception of a request to set the first connection from a plurality of the first network elements, the setting of the first connection with any one of the first network elements having a relatively smaller load.

* * * * *